United States Patent
Hosokawa et al.

(10) Patent No.: US 10,429,688 B2
(45) Date of Patent: Oct. 1, 2019

(54) LIQUID CRYSTAL DISPLAY DEVICE

(71) Applicant: Japan Display Inc., Minato-ku (JP)

(72) Inventors: Daichi Hosokawa, Tokyo (JP); Tetsuya Iizuka, Tokyo (JP)

(73) Assignee: Japan Display Inc., Minato-ku (JP)

( * ) Notice: Subject to any disclaimer, the term of this patent is extended or adjusted under 35 U.S.C. 154(b) by 556 days.

(21) Appl. No.: 14/976,874

(22) Filed: Dec. 21, 2015

(65) Prior Publication Data

US 2016/0187717 A1 Jun. 30, 2016

(30) Foreign Application Priority Data

Dec. 25, 2014 (JP) ................................ 2014-262276
Sep. 28, 2015 (JP) ................................ 2015-189312

(51) Int. Cl.
*G02F 1/1335* (2006.01)
*G02F 1/1339* (2006.01)
(Continued)

(52) U.S. Cl.
CPC .... *G02F 1/133512* (2013.01); *G02F 1/13394* (2013.01); *G02F 1/134309* (2013.01); *G02F 1/136286* (2013.01)

(58) Field of Classification Search
None
See application file for complete search history.

(56) References Cited

U.S. PATENT DOCUMENTS

2010/0012939 A1* 1/2010 Ishii .................. G02F 1/136213
257/59
2012/0327338 A1* 12/2012 Kobayashi ........ G02F 1/133512
349/106
(Continued)

FOREIGN PATENT DOCUMENTS

CN 101191938 A 6/2008
CN 101419366 A 4/2009
(Continued)

OTHER PUBLICATIONS

Combined Chinese Office Action and Search Report dated May 30, 2018 in Chinese Patent Application No. 201510993529.2(with English translation), 25 pages.
(Continued)

*Primary Examiner* — Edward J Glick
*Assistant Examiner* — Anthony G Quash
(74) *Attorney, Agent, or Firm* — Oblon, McClelland, Maier & Neustadt, L.L.P.

(57) ABSTRACT

A liquid crystal display device includes a first substrate, a second substrate, a liquid crystal layer, first to fourth main light shields, a sub light shield, a spacer, and a spacer light shield disposed around the spacer. The spacer light shield includes a first part formed integrally with the second main light shield and the sub light shield between the first main light shield and the second main light shield, a second part formed integrally with the second main light shield, the third main light shield, and the sub light shield between the second main light shield and the third main light shield, and a third part formed integrally with the third main light shield and the sub light shield between the third main light shield and the fourth main light shield.

7 Claims, 21 Drawing Sheets

(51) Int. Cl.
     *G02F 1/1343*     (2006.01)
     *G02F 1/1362*     (2006.01)

(56) References Cited

U.S. PATENT DOCUMENTS

| | | | |
|---|---|---|---|
| 2013/0342795 A1 | 12/2013 | Park et al. | |
| 2014/0028954 A1* | 1/2014 | Shibazaki | G02F 1/13394 349/64 |
| 2015/0160519 A1* | 6/2015 | Cho | G02F 1/1339 349/138 |
| 2015/0198850 A1* | 7/2015 | Tasaka | G02F 1/1368 349/46 |
| 2015/0301378 A1* | 10/2015 | Ishii | H01L 27/124 349/110 |
| 2016/0170276 A1* | 6/2016 | Okita | G02F 1/136286 349/43 |

FOREIGN PATENT DOCUMENTS

| | | | | |
|---|---|---|---|---|
| CN | 102346339 A | | 2/2012 | |
| CN | 103513470 A | | 1/2014 | |
| CN | 104020605 A | * | 9/2014 | G02F 1/1335 |
| CN | 104199211 A | | 12/2014 | |
| JP | 2013-7955 | | 1/2013 | |
| JP | 2014-2385 | | 1/2014 | |
| KR | 10-0851181 B1 | | 8/2008 | |

OTHER PUBLICATIONS

Combined Chinese Office Action and Search Report dated Feb. 11, 2019 in Chinese Patent Application No. 201510993529.2 (with unedited computer generated English translation), 27 pages.

\* cited by examiner

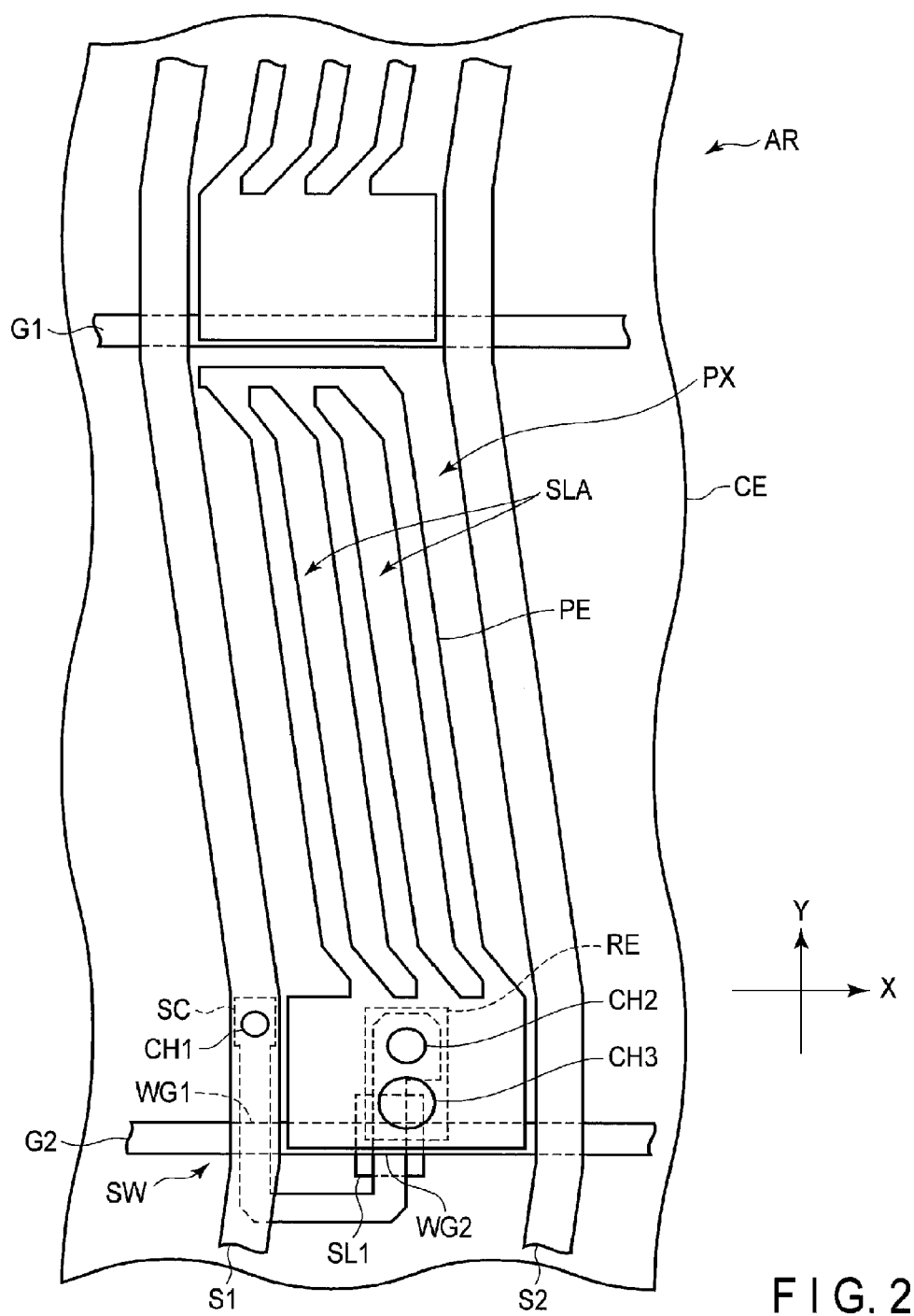
F I G. 2

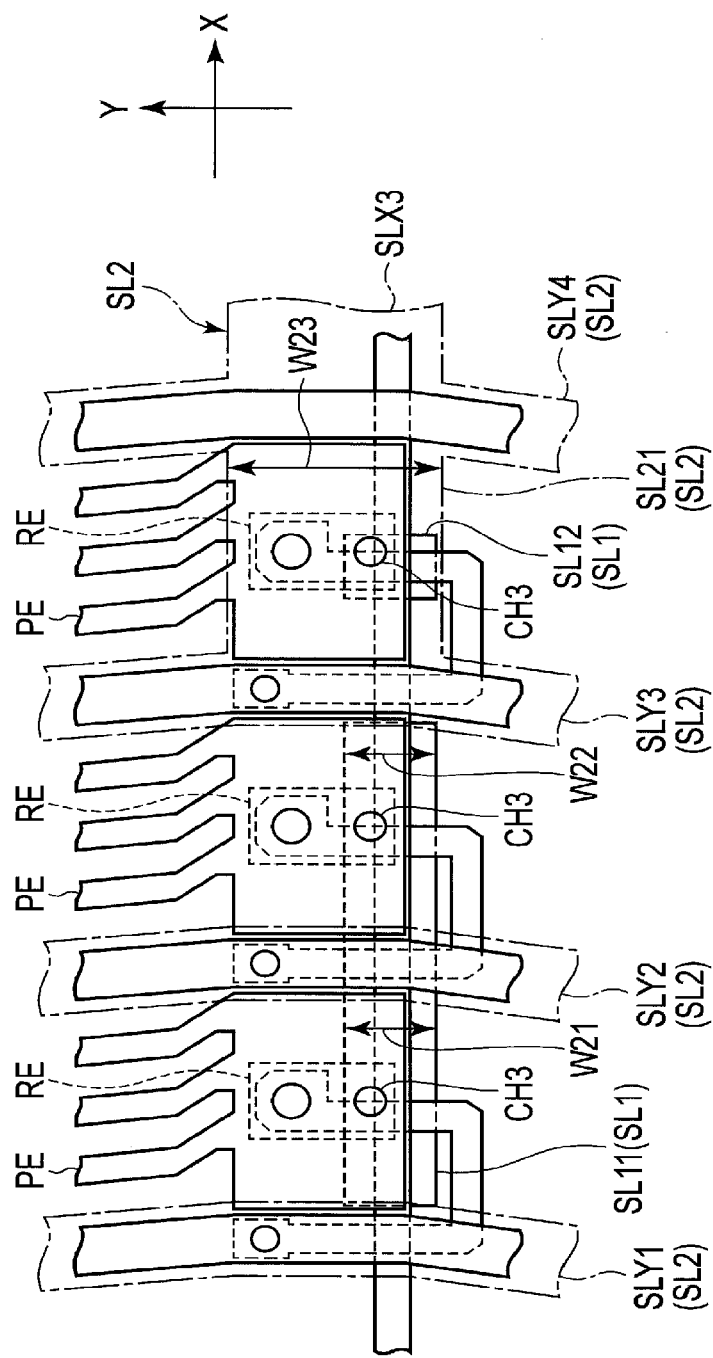
F I G. 4B

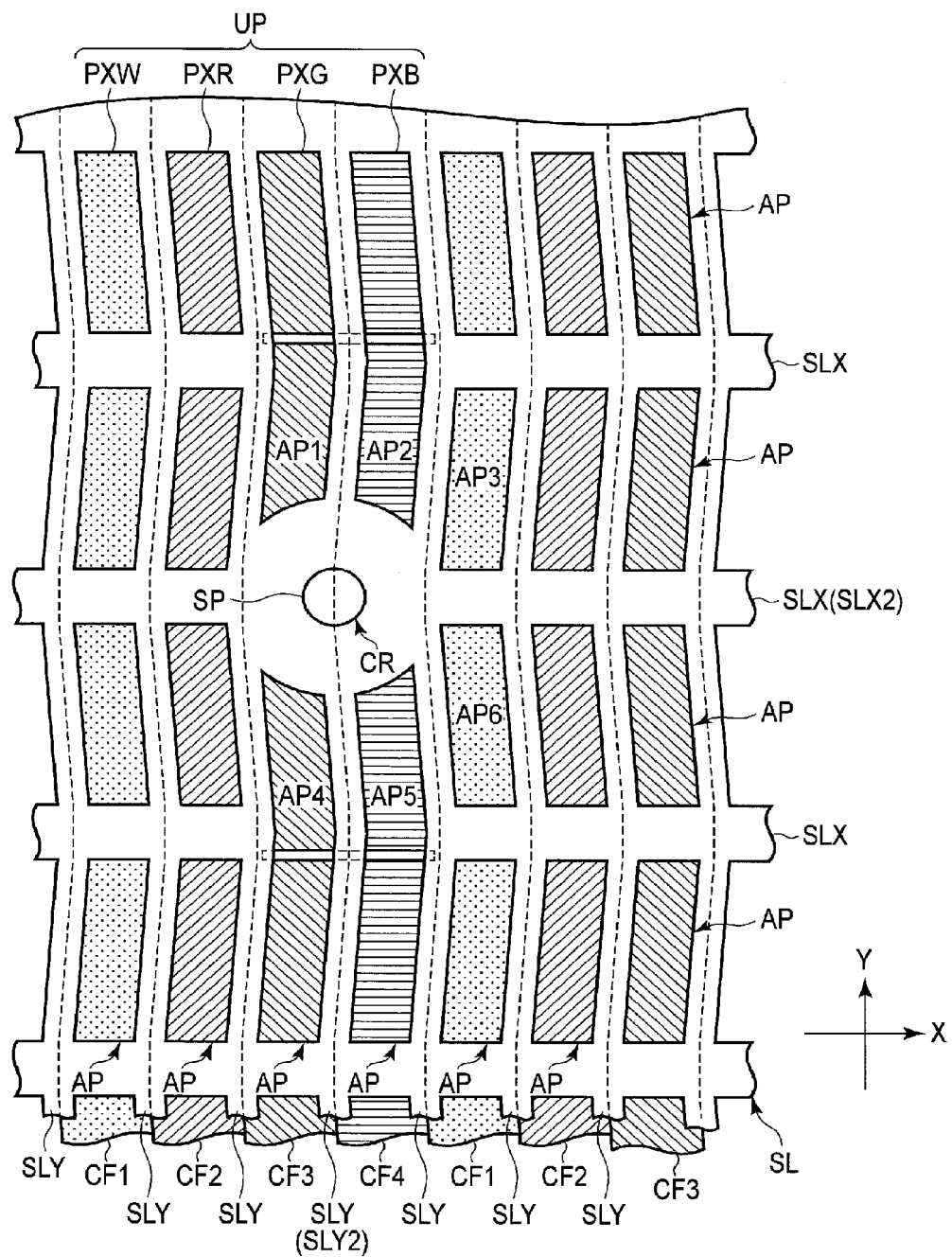
F I G. 4C

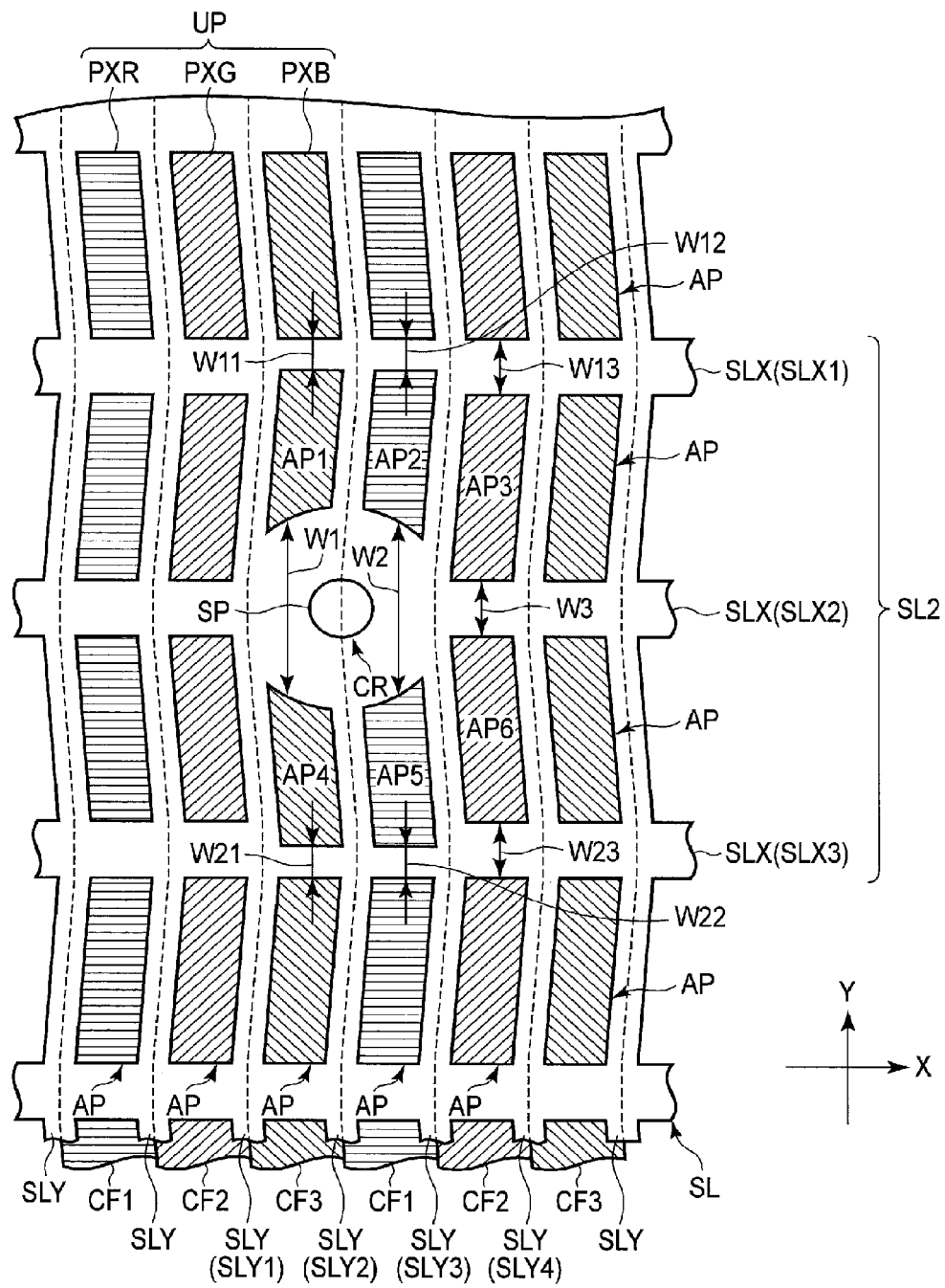
F I G. 5A

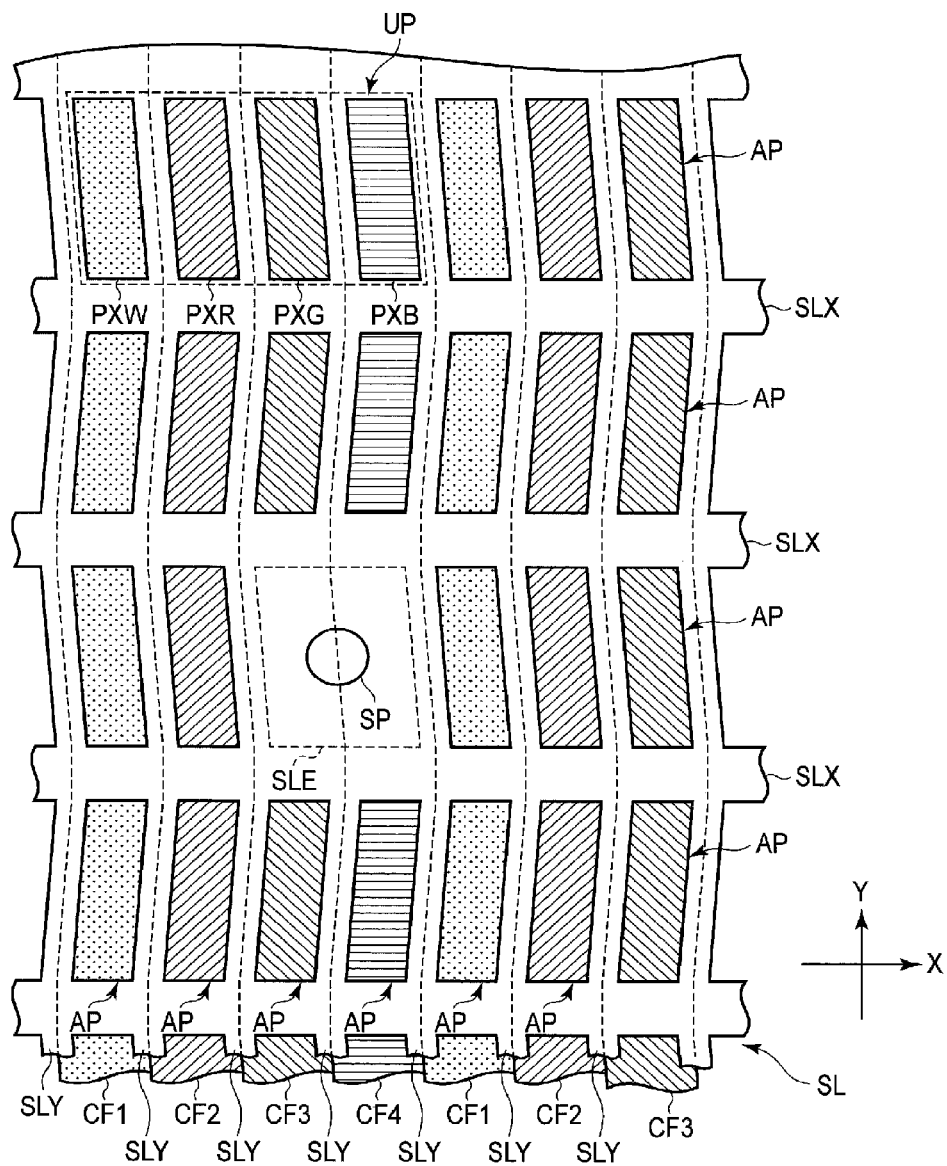
F I G. 7B

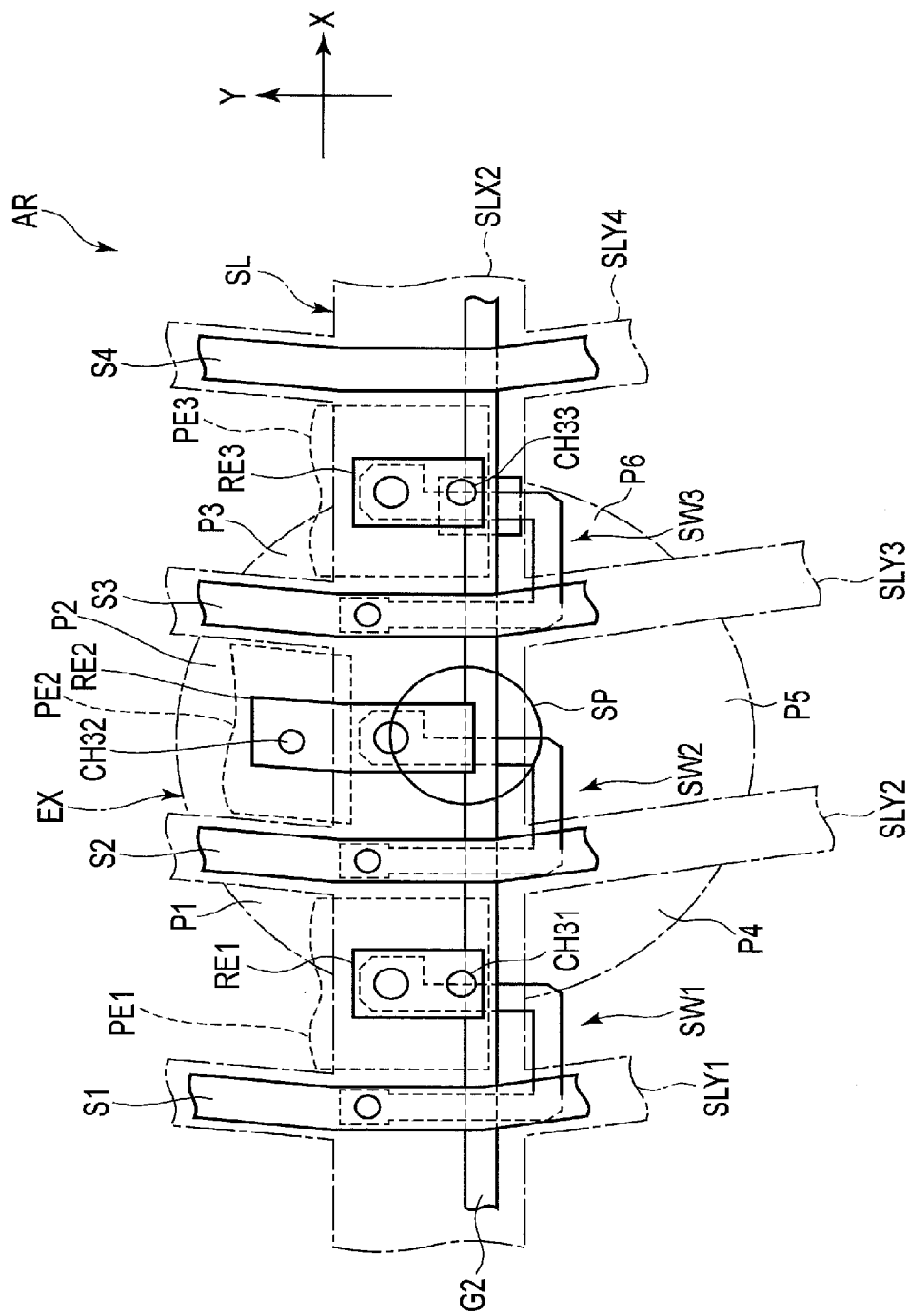
F I G. 9

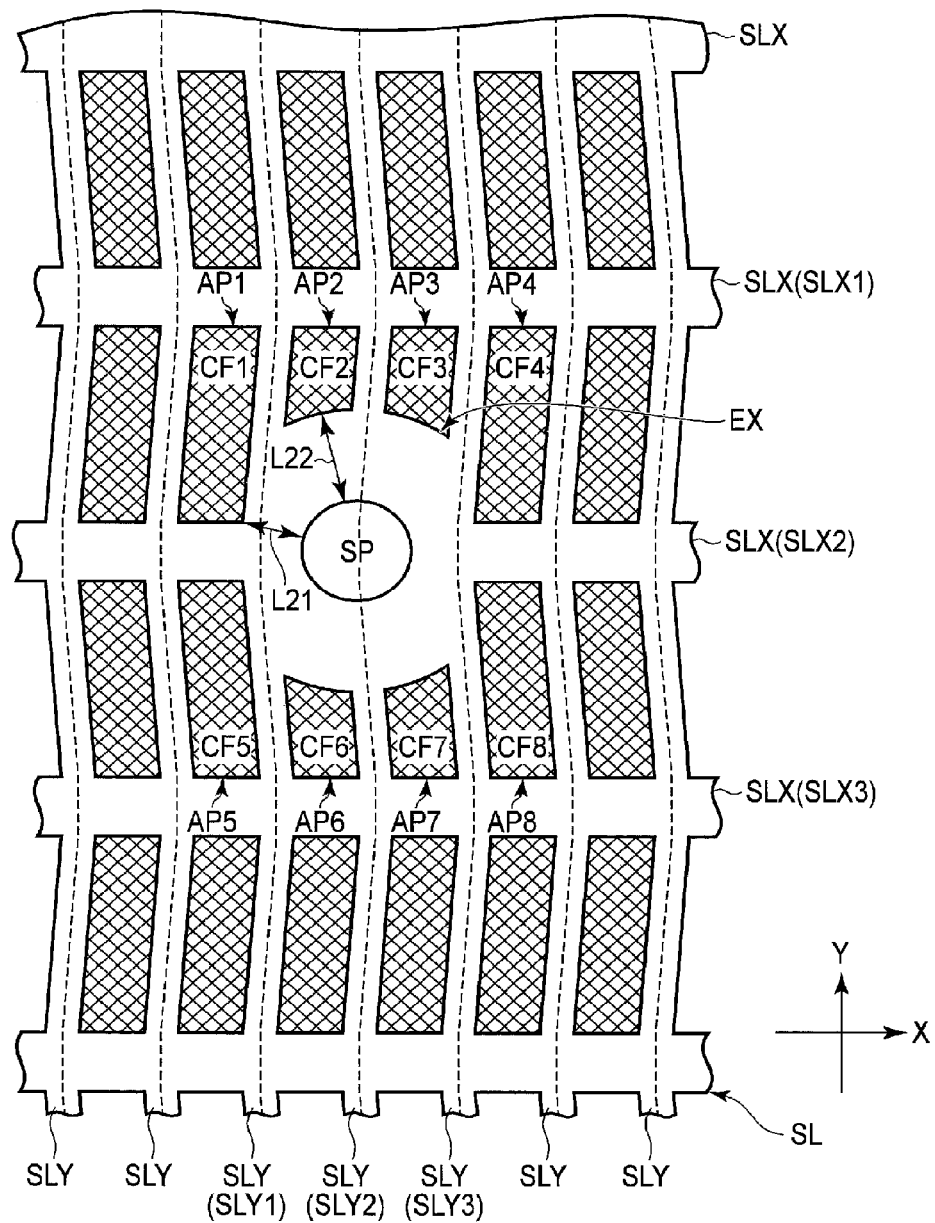
F I G. 13

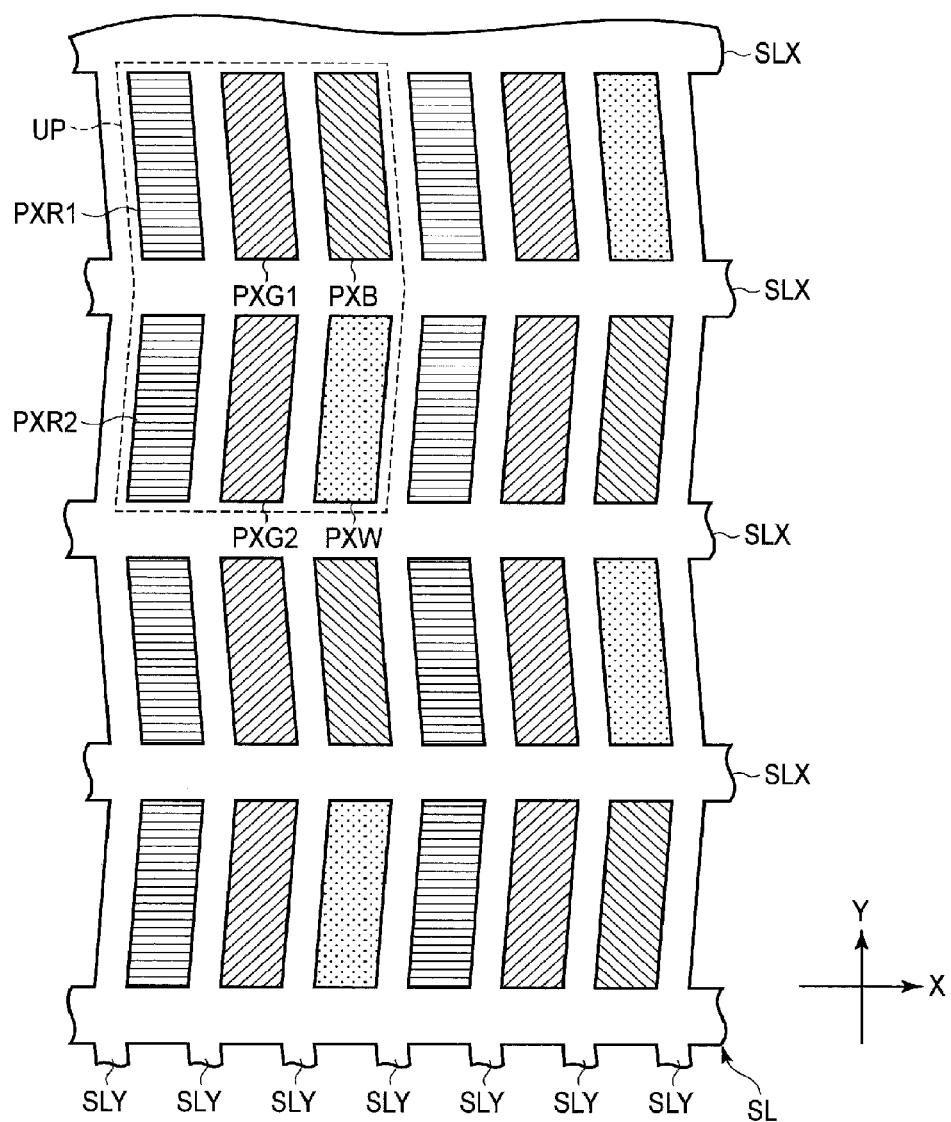
F I G. 14

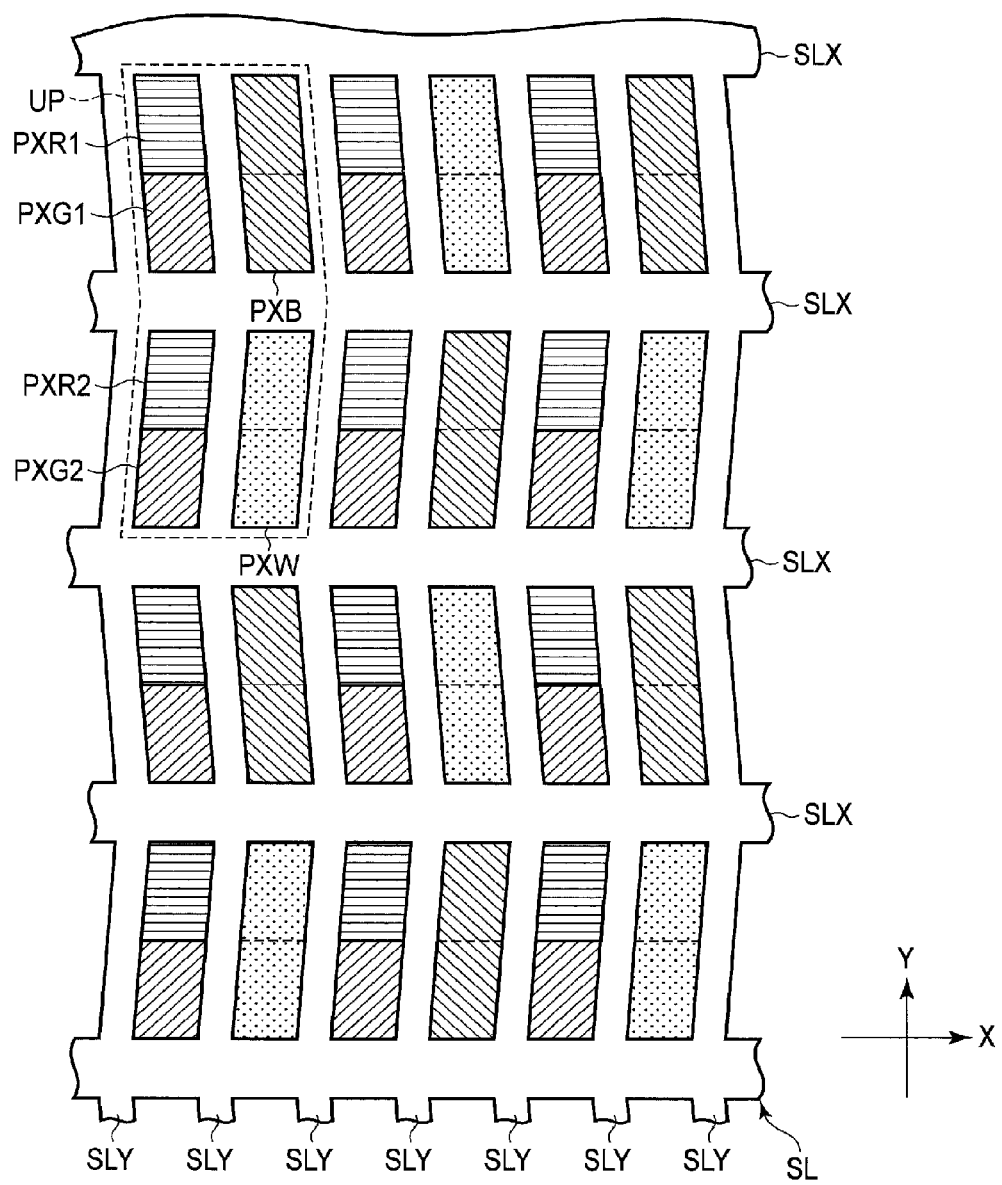
F I G. 15

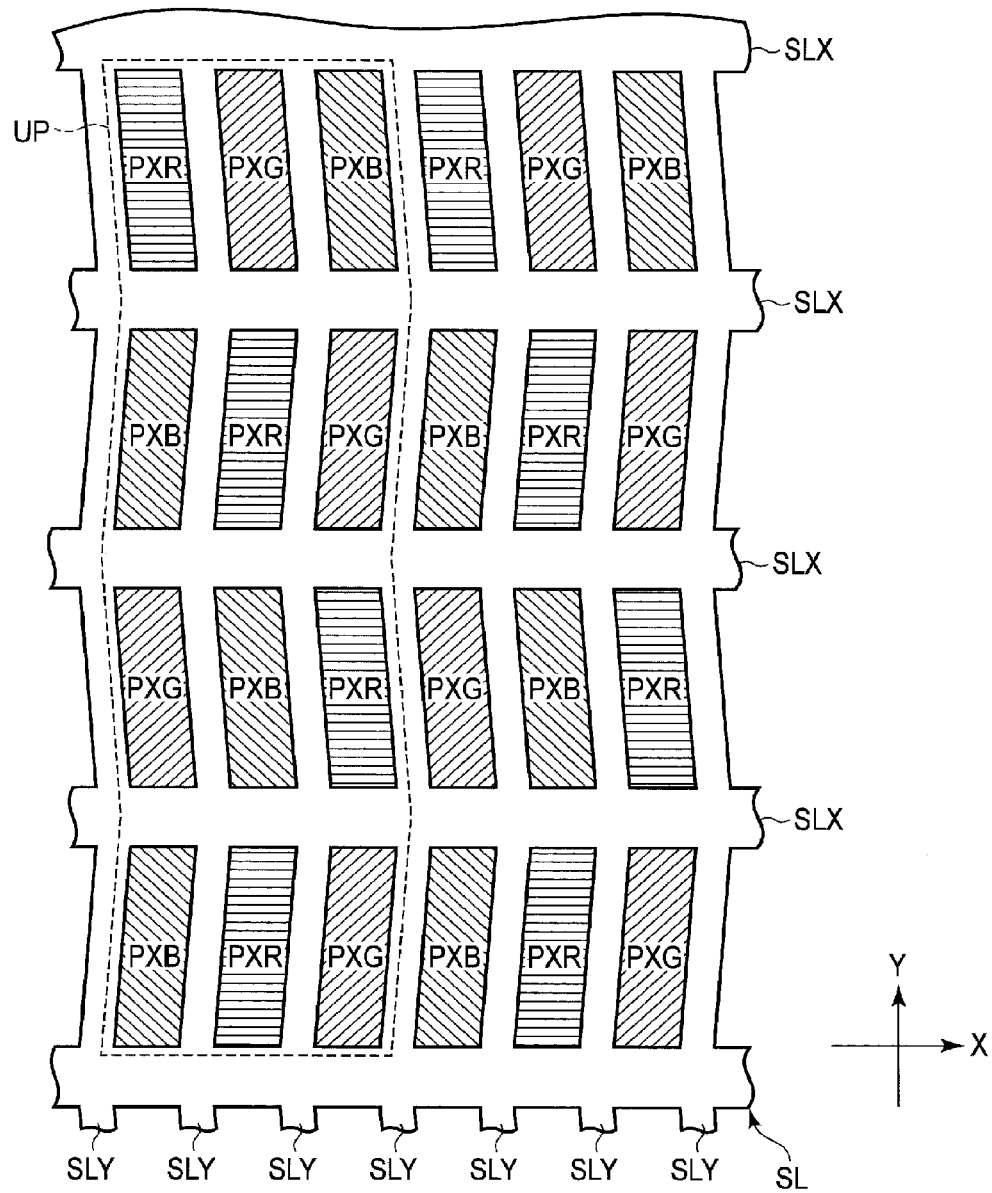
F I G. 16 ically shows the display panel PNL with the pixel structure of FIG. 2.
LIQUID CRYSTAL DISPLAY DEVICE

CROSS-REFERENCE TO RELATED APPLICATIONS

This application is based upon and claims the benefit of priority from Japanese Patent Applications No. 2014-262276, filed Dec. 25, 2014; and No. 2015-189312, filed Sep. 28, 2015, the entire contents of all of which are incorporated herein by reference.

FIELD

Embodiments described herein relate generally to a liquid crystal display device.

BACKGROUND

Liquid crystal display devices include, for example, columnar spacers to form a certain gap between a pair of substrates. Light leakage may occur around the spacers because of alignment disorder in liquid crystal molecules. As a countermeasure against such light leakage, there is a well-known technique of setting a light shielding layer overlapping a spacer larger than a light shielding layer not overlapping a spacer, for example. As another example, there is a well-known technique of using a light shielding layer with an enlarged part overlapping a spacer and a light shielding layer with an enlarged part not overlapping a spacer such that a difference in an aperture ratio between a pixel with a spacer and a pixel without a spacer can be reduced.

BRIEF DESCRIPTION OF THE DRAWINGS

FIG. 2 is a plan view which shows an example of the structure of a pixel PX in an array substrate AR of FIG. 1.

FIG. 4B is a plan view which shows a structural example of a sub light shield SLX3 of FIG. 4A.

FIG. 4C is a plan view which shows a first variation of the light shield SL and the spacer SP.

FIG. 5A is a plan view which shows a second structural example of the light shield SL and the spacer SP.

FIG. 7B is a plan view which shows a fourth variation of the light shield SL and the spacer SP.

FIG. 9 is a plan view which shows the array substrate AR opposed to the spacer SP of FIG. 8.

FIG. 13 is a plan view which shows a ninth structural example of the light shield SL and the spacer SP.

FIG. 14 shows another structure of the unit pixel UP.

FIG. 15 shows still another structure of the unit pixel UP.

FIG. 16 shows still another structure of the unit pixel UP.

DETAILED DESCRIPTION

In general, according to one embodiment, provided is a liquid crystal display device including: a first substrate including first to fourth source lines arranged in series in a first direction and first to third gate lines arranged in series in a second direction; a second substrate opposed to the first substrate; a liquid crystal layer held between the first substrate and the second substrate; first to fourth main light shields opposed to the first to fourth source lines, respectively; a sub light shield crossing the first to fourth main light shields to be opposed to the second gate line; a spacer disposed between the second source line and the third source line; and a spacer light shield disposed around the spacer, wherein the spacer light shield includes a first part formed integrally with the second main light shield and the sub light shield between the first main light shield and the second main light shield, a second part formed integrally with the second main light shield, the third main light shield, and the sub light shield between the second main light shield and the third main light shield, and a third part formed integrally with the third main light shield and the sub light shield between the third main light shield and the fourth main light shield.

Hereinafter, the embodiment will be described with reference to the accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, the widths, thickness, shape, and the like of each element are depicted schematically in the Figures as compared to actual embodiments for the sake of simpler explanation, and they are not to limit the interpretation of the invention of the present application. Furthermore, in the description and figures of the present application, structural elements having the same or similar functions will be referred to by the same reference numbers and detailed explanations of them that are considered redundant may be omitted.

Figure 1:
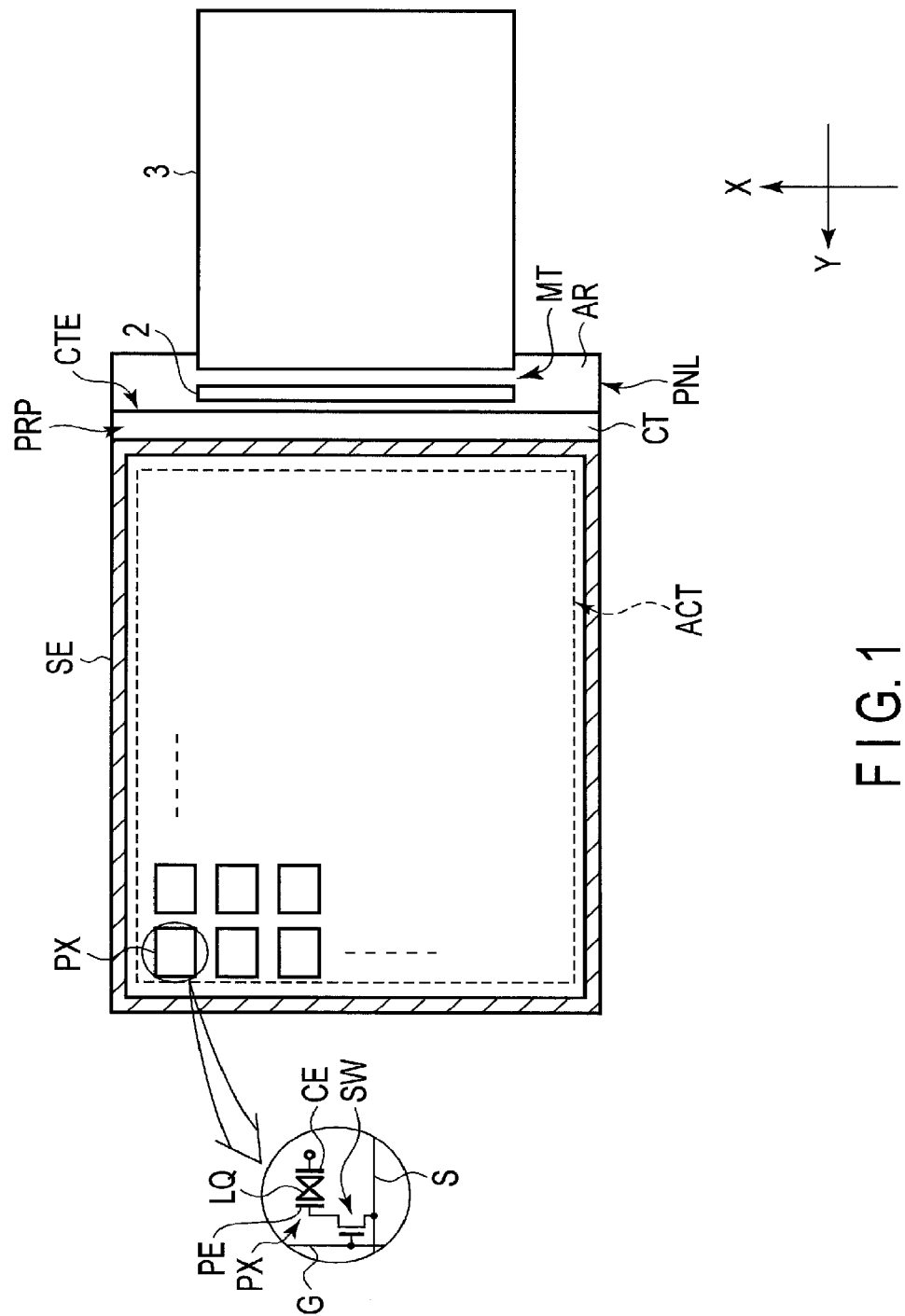
FIG. 1 schematically shows a display panel PNL of a liquid crystal display device of an embodiment.

FIG. 1 schematically shows a display panel PNL of a liquid crystal display device of the present embodiment.

That is, the display panel PNL includes an array substrate (first substrate) AR, counter substrate (second substrate) CT opposed to the array substrate AR, and liquid crystal layer LQ held between the array substrate and the counter substrate CT. The array substrate AR and the counter substrate CT are adhered with a sealant SE with a certain gap formed therebetween. The gap is formed by spacers SP which will be explained later. The liquid crystal layer LQ is held inside the gap which is surrounded by the sealant SE and is held between the array substrate AT and the counter substrate CT. The display panel PNL includes an active area (display area) ACT inside the space surrounded by the sealant SE for image display. The active area ACT is composed of a plurality of pixels PX arranged in a matrix.

The array substrate AR includes, in the active area ACT, a gate line G extending in a first direction X, a source line S extending in a second direction Y which crosses the first direction X, a switching element SW electrically connected to the gate line G and source line S in each pixel PX, and a pixel electrode PE electrically connected to the switching element SW in each pixel PX. A common electrode CE of common potential is provided with the array substrate AR or the counter substrate CT to be opposed to a plurality of pixel electrodes PE. Note that the gate line G is not necessarily formed in a linear manner to be parallel to the first direction X and the source line S is not necessarily formed in a linear manner to be parallel to the second direction Y. That is, the gate line G and the source line S may be formed to bend or partly branch.

Note that, although the structure of the display panel PNL is not detailed here, display modes used therein include the following examples. A vertical field display mode such as twisted nematic (TN) mode, optically compensated bend (OCB) mode, and vertically aligned (VA) mode uses a vertical field along the normal to the substrate main surface (X-Y plane). An oblique field display mode uses an oblique field with respect to the substrate main surface. In the vertical field display mode and the oblique field mode, the pixel electrode PE is provided with the array substrate AR while the common electrode CE is provided with the counter substrate CT. A transverse field display mode such as in-plane switching (IPS) mode and fringe field switching (FFS) mode uses a transverse field along the substrate main surface. In the transverse field display mode, both the pixel electrode PE and the common electrode CE are provided with the array substrate AR. Furthermore, the display panel PNL may be of a display mode of an arbitrary combination of the vertical field, transverse field, and oblique field display modes.

Signal suppliers such as a drive IC chip 2 and flexible printed circuit (FPC) 3 are used for drive of the display panel PNL and are arranged in a peripheral area (non-display area) PRP outside the active area ACT. In the example depicted, the drive IC chip 2 and the FPC 3 are mounted on a mount MT of the array substrate AR which extends to the outside of a substrate end CTE of the counter substrate CT.

FIG. 2 is a plan view which shows an example of the structure of the pixel PX in the array substrate AR of FIG. 1. Note that the pixel structure explained here is of the FFS mode display panel PNL, for example.

The array substrate AR includes gate lines G1 and G2, source lines S1 and S2, switching element SW, pixel electrode PE, common electrode CE, and first light shielding film SL1, for example.

Gate lines G1 and G2 extend along the first direction X and are arranged in the second direction Y at intervals. Source lines S1 and S2 basically extend in the second direction Y and are arranged in the first direction X at intervals. Gate lines G1 and G2 and source lines S1 and S2 cross each other.

The switching element SW is provided with the proximity of a crossing portion of gate line G2 and source line S1 and is electrically connected thereto. The switching element SW includes a semiconductor layer SC. The semiconductor layer SC is formed of polycrystalline silicon (p-Si), for example.

In the example depicted, the switching element SW is a double gate-type switching element which includes gate electrode WG1 and gate electrode WG2. Gate electrodes WG1 and WG2 are components of gate line G2 which is opposed to the semiconductor layer SC. The semiconductor layer SC has one end which is electrically connected to source line S1 and has the other end which is electrically connected to the pixel electrode PE. Source line S1 contacts one end of the semiconductor layer SC through contact hole CH1. A relay electrode RE is disposed between the other end of the semiconductor layer SC and the pixel electrode PE. The relay electrode RE contacts the other end of the semiconductor layer SC through contact hole CH2. The pixel electrode FE contacts the relay electrode RE through contact hole CH3. The first light shielding film SL1 is formed in an island shape between source lines S1 and S2. The first light shielding film SL1 is disposed on the rear surface side of the semiconductor layer SC in an area opposed to gate electrode WG2.

The common electrode CE is formed to be opposed to a plurality of pixel electrodes PE. The common electrode CE is disposed on the rear surface side of the pixel electrodes PE. Slits SLA are formed in the pixel electrodes PE to face the common electrode CE. The slits SLA extend in a direction different from the first direction X and the second direction Y, and in this example, they extend substantially parallel to source lines S1 and S2. In the example depicted, two slits SLA are formed in one pixel electrode PE; however, the number of the slits SLA may be only one or may be three or more. Furthermore, the pixel electrode PE may not have any slit. Note that the phrase rear surface side used here means a side opposed to a first insulating substrate 10, which will be described later.

Figure 3:
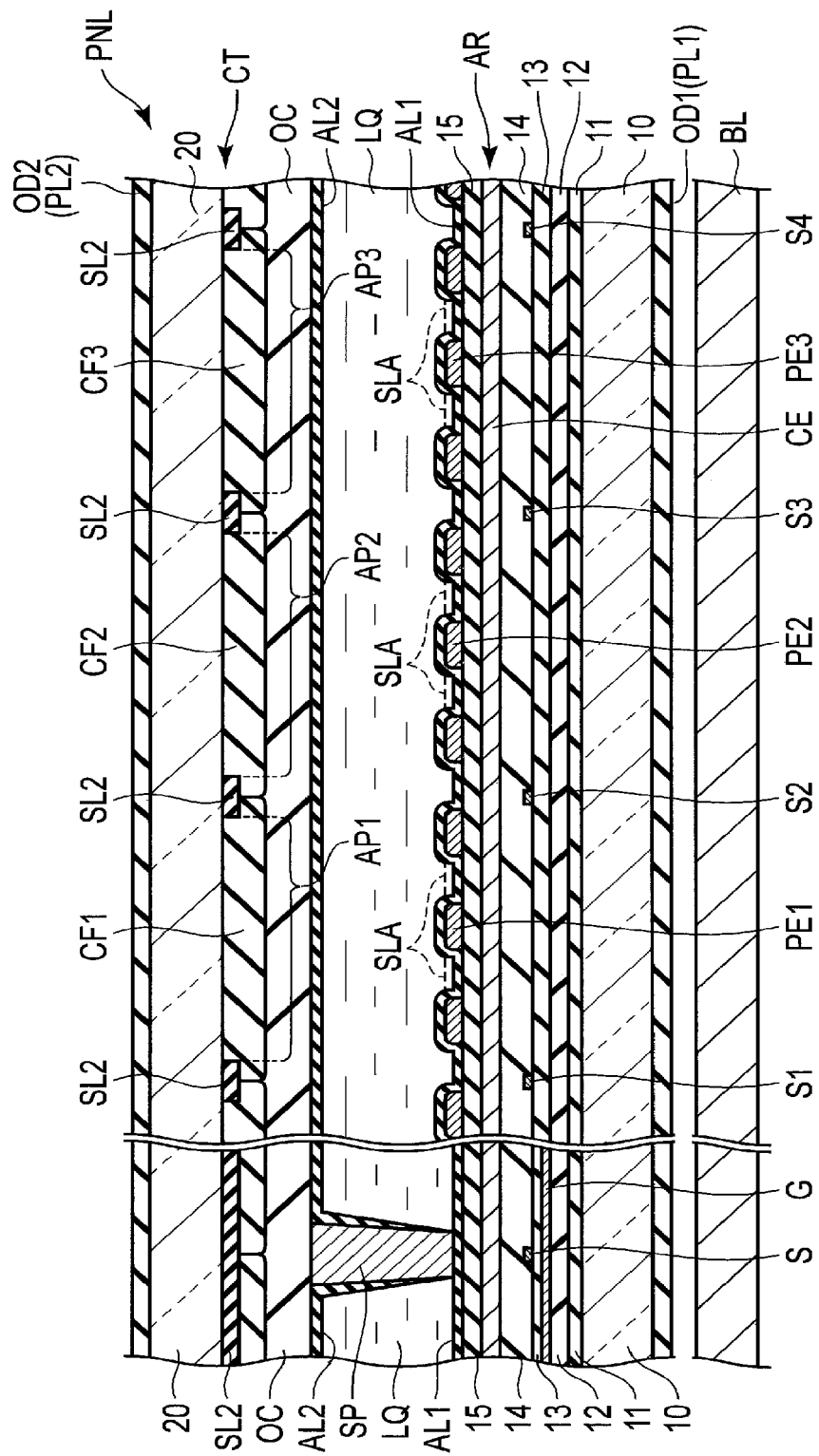
FIG. 3 is a cross-sectional view which schematically shows the display panel PNL with the pixel structure of FIG. 2.

FIG. 3 is a cross-sectional view which schematically shows the structure of the display panel PNL with the pixel structure of FIG. 2. In the figure, only essential elements for the explanation are shown.

The display panel PNL includes an array substrate AR, counter substrate CT, liquid crystal layer LQ, and spacer SP. The spacer SP is interposed between the array substrate AR and the counter substrate CT. In this example, the spacer SP is provided with the counter substrate CT; however, it may be provided with the array substrate AR.

The array substrate AR is formed of a transparent first insulating substrate 10 such as a glass substrate or a resin substrate. The array substrate AR includes a first insulating film 11, second insulating film 12, third insulating film 13, fourth insulating film 14, fifth insulating film 15, gate line G, source lines (S1 to S4), pixel electrodes PE1 to PE3, common electrode CE, and first alignment film AL1. Note that an expression "on" used in the following explanation of the array substrate AR means its side closer to the counter substrate CT.

The first insulating film 11 is disposed on the first insulating substrate 10. The second insulating film 12 is disposed on the first insulating film 11. The third insulating film 13 is disposed on the second insulating film 12. Source lines S (S1 to S4) are formed on the third insulating film 13. The fourth insulating film 14 is disposed on the third insulating film 13 to cover source lines S (S1 to S4). Note that the first light shielding film SL1 of FIG. 2 is disposed between the first insulating substrate 10 and the first insulating film 11, and similarly, the semiconductor layer SC of the switching element SW is disposed between the first insulating film 11 and the second insulating film 12, the gate line G and gate electrodes WG1 and WG2 are disposed between the second insulating film 12 and the third insulating film 13, and the relay electrode RE is disposed between the third insulating film 13 and the fourth insulating film 14.

The common electrode CE is disposed on the fourth insulating film 14. The common electrode CE is formed of a transparent conductive material such as indium tin oxide (ITO) and indium zinc oxide (Ia)). The common electrode CE is covered with the fifth insulating film 15.

Pixel electrodes PE1 to PE3 are disposed on the fifth insulating film 15 to face the common electrode CE. Pixel electrodes PE1 to PE3 each include slits SLA. Pixel electrodes PE1 to PE3 are formed of a transparent conductive material such as ITO or IZO. Pixel electrodes PE1 to PE3 are covered with the first alignment film AL1. The first alignment film AL1 covers the fifth insulating film 15. The first alignment film AL1 is formed of a material indicative of a horizontal alignment state, and is provided with the array substrate AR on the surface contacting the liquid crystal layer LQ.

On the other hand, the counter substrate CT is formed of a transparent second insulating substrate 20 such as a glass substrate or a resin substrate. The counter substrate CT includes a second light shielding film SL2, color filters CF1 to CF3, overcoat layer OC, and second alignment film AL2 on the second insulating substrate 20 at the side opposed to the array substrate AR.

The second light shielding film SL2 is provided with the second insulating substrate 20 on the side opposed to the array substrate AR. The second light shielding film SL2 is disposed along each border of pixels to form apertures AP1 to AP3 opposed to pixel electrodes PE1 to PE3, respectively. In the example depicted, the second light shielding film SL2 is formed in the positions opposed to source lines S1 to S4. The second light shielding film SL2 is formed of a black resin material or a light shielding metal material.

Color filters CF1 to CF3 are provided with the second insulating substrate 20 on the side opposed to the array substrate AR and they partly overlap the second light shielding film SL2. In this example, color filter CF1 is disposed in aperture AP1, color filter CF2 is disposed in aperture AP2, and color filter CF3 is disposed in aperture AP3. Color filters CF1 to CF3 are formed of resin materials of different colors. In this example, color filter CF1 is red, color filter CF2 is green, and color filter CF3 is blue. Note that, a color filer of a color other than blue, red, and green may be added to color filters CF1 to CF3, and the additional one may be white or substantially transparent.

The overcoat layer OC covers color filters CF1 to CF3. The overcoat layer OC is formed of a transparent resin material. The second alignment film AL2 covers the overcoat layer OC. The second alignment film AL2 is formed of a material indicative of a horizontal alignment state and is provided with the counter substrate CT on the surface contacting the liquid crystal layer LQ.

A spacer SP is shaped in, for example, a column and extends from the overcoat layer OC toward the array substrate AR. The spacer SP is formed at a position opposed to the source line S, and in this example, it is formed at a position opposed to a crossing point of the gate line G and the source line S.

The array substrate AR and the counter substrate CT explained above are arranged such that the first alignment film AL1 and the second alignment film AL2 face each other. At that time, a certain cell gap is formed by a columnar spacer SP (described later) between the array substrate AR and the counter substrate CT. The array substrate AR and the counter substrate CT are attached together by a sealant SE with the cell gap formed therebetween. The liquid crystal layer LQ is filled between the first alignment film AL1 of the array substrate AR and the second alignment film AL2 of the counter substrate CT.

At the rear surface side of the display panel PNL structured as above, a backlight unit BL is disposed. Various models can be applied to the backlight unit BL; however, details thereof are not described here.

A first optical element OD1 including a first polarizer PL1 is provided with the outer surface of the array substrate AR, that is, the outer surface of the first insulating substrate 10. A second optical element OD2 including a second polarizer PL2 is provided with the outer surface of the counter substrate CT, that is, the outer surface of the second insulating substrate 20. The first polarizer PL1 has a first absorption axis and the second polarizer PL2 has a second absorption axis, and the first absorption axis and the second absorption axis are in a crossed-Nicol state.

Now, a first structural example of a light shield SL will be explained.

Figure 4A:
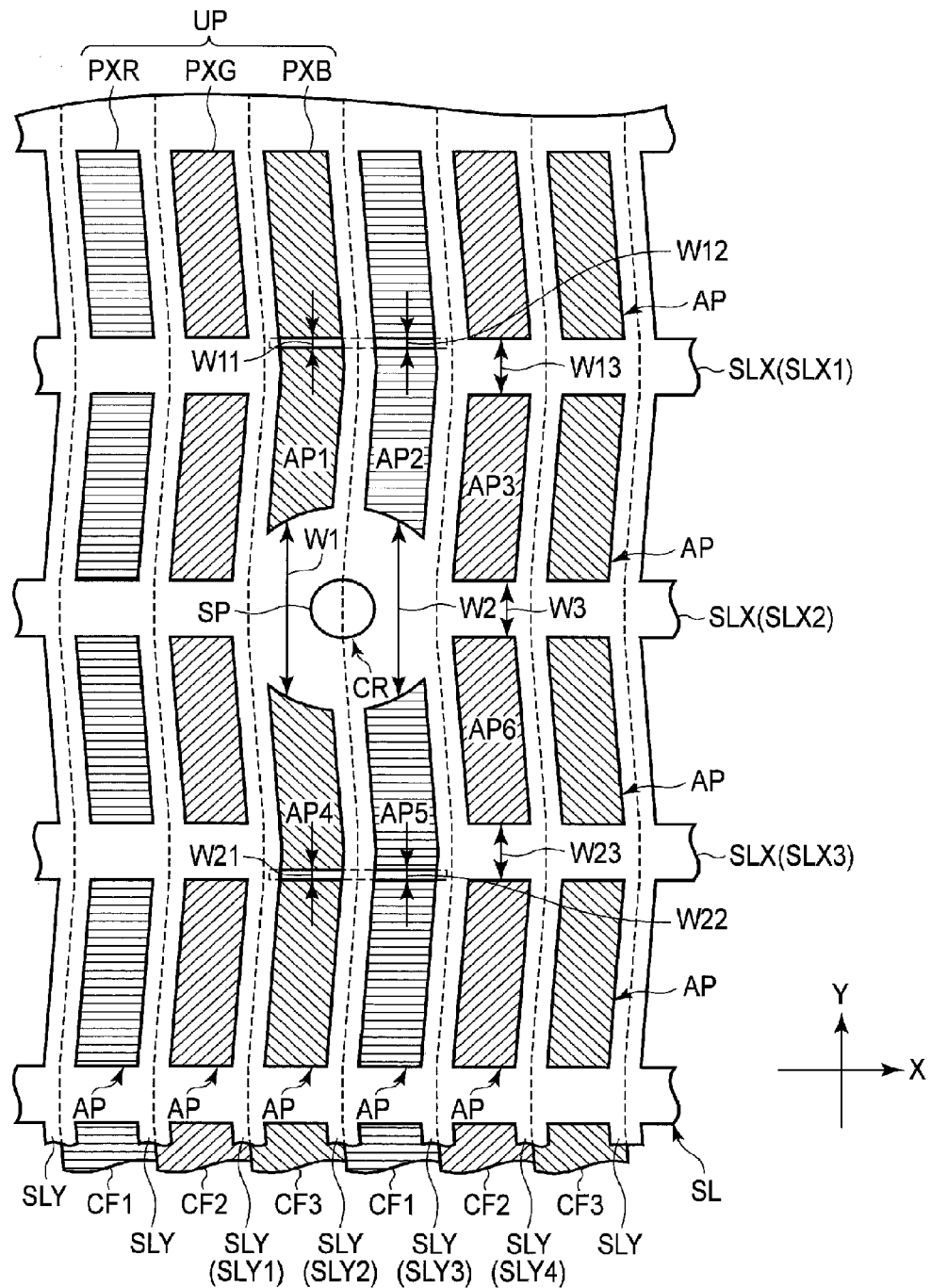
FIG. 4A is a plan view which shows a first structural example of a light shield SL and a spacer SP.

FIG. 4A is a plan view which shows a first structural example of the light shield SL and the spacer SP.

The light shield SL includes a plurality of main light shields SLY arranged in the first direction X and a plurality of sub light shields SLX arranged in the second direction Y. The main light shields SLY and the sub light shields SLX are mainly formed of the second light shielding film SL2. The sub light shields SLX are at least partly formed of the first light shielding film SL1.

The main light shields SLY extend along the second direction Y. In the example depicted, the main light shields SLY partly bend to be parallel to a direction different from the first direction X and the second direction Y; however, the bending direction is substantially parallel to the second direction Y. The sub light shields SLX extend linearly along the first direction X. The main light shields SLY and the sub light shields SLX cross each other to form the apertures AP arranged in a matrix.

A unit pixel UP for color display is composed of a plurality of different color pixels. The unit pixel UP is a minimum unit of a color image displayed in the active area. In the example depicted, the unit pixel UP is composed of three pixels PXR, PXG, and PXB arranged in the first direction X. Pixel PXR is a red pixel, pixel PXG is green pixel, and pixel PXB is a blue pixel. The apertures AP are formed to correspond to pixels PXR, PXG, and PXB.

Color filters CF1 to CF3 extend in the second direction Y to overlap the apertures AP arranged in the second direction Y. Color filters CF1 to CF3 are arranged in the first direction X in this order. Ends of adjacent color filters overlap the main light shields SLY. In this example, color filter CF1 is a red color filter, color filter CF2 is a green color filter, and color filter CF3 is a blue color filter.

Here, the following explanation will be given focusing on main light shields SLY1 to SLY4 of the main light shields SLY and sub light shields SLX1 to SLX3 of the sub light shields SLX. Sub light shield SLX2 is expanded in the second direction Y between main light shields SLY1 and SLY3. That is, sub light shield SLX2 has a width W1 in the second direction Y between main light shields SLY1 and SLY2, a width W2 in the second direction Y between main light shields SLY2 and SLY3, and a width W3 in the second direction Y between the main light shields SLY3 and SLY4, and widths W1 and W2 are each greater than width W3. Thus, a crossing portion CR of main light shield SLY2 and sub light shield SLX2 is expanded to have a greater area as compared to crossing portions of other main light shield and sub light shield.

The spacer SP is disposed to a position opposed to the expanded crossing portion CR. The spacer SP is positioned at substantially the center of the crossing portion CR. That is, the spacer SP and sub light shield SLX2 are on the same straight line. Thus, the periphery of the spacer SP is light-shielded over a relatively large area.

On the other hand, sub light shield SLX1 is narrowed in the second direction Y between main light shields SLY1 and SLY3. That is, sub light shield SLX1 has a width W11 along the second direction Y between main light shields SLY1 and SLY2, a width W12 along the second direction Y between main light shields SLY2 and SLY3, and a width W13 along the second direction Y between main light shields SLY3 and SLY4, and widths W11 and W12 are each less than width W13. Note that widths W11 and W12 are substantially equal. Similarly, sub light shield SLX3 is narrowed in the second direction Y between main light shields SLY1 and SLY3. That is, sub light shield SLX3 has a width W21 along the second direction Y between main light shields SLY1 and SLY2, a width W22 along the second direction Y between main light shields SLY2 and SLY3, and a width W23 along the second direction Y between main light shields SLY3 and SLY4. Note that widths W21 and W22 are substantially equal.

Apertures AP1 to AP3 are arranged in the first direction X in this order. Aperture AP1 is defined by main light shields SLY1 and LSY2 and sub light shields SLX1 and SLX2. Aperture AP2 is defined by main light shields SLY2 and SLY3 and sub light shields SLX1 and SLX2. Aperture AP3 is defined by main light shields SLY3 and SLY4 and sub light shields SLX1 and SLX2. Apertures AP1 and PA2 are shifted to be further distant from the spacer SP along the second direction Y that is aperture AP3.

Apertures AP4 to AP6 are arranged in the first direction X in this order. Aperture AP4 is defined by main light shields SLY1 and SLY2 and sub light shields SLX2 and SLX3. Aperture AP5 is defined by main light shields SLY2 and SLY3 and sub light shields SLX2 and SLX3. Aperture AP6 is defined by main light shields SLY3 and SLY4 and sub light shields SLX2 and SLX3. Apertures AP4 and AP5 are shifted to be further distant from the spacer SP along the second direction Y than is aperture AP6. Each of apertures AP4 and AP5 is equal in size to aperture AP6.

That is, in the first structural example, a spacer SP is provided with the expanded crossing portion CR of main light shield SLY2 and sub light shield SLX2 with a light shielding area formed around the spacer SP while apertures disposed around the spacer SP (AP1, AP2, AP4, and AP5 in the example depicted) are formed to be shifted in the second direction Y to suppress a decrease in the area of the apertures caused by expanded crossing portion CR. That is, the periphery of the position where the spacer SP is disposed is light-shielded over a relatively large range. Therefore, even if alignment disorder of liquid crystal molecules may occur around the spacer SP, light leakage caused thereby can be suppressed. Furthermore, a decrease in the contrast ratio caused by the light leakage can be suppressed, too. Therefore, the display quality can be maintained.

Furthermore, a decrease of the area of the apertures around the spacer SP can be suppressed and deterioration of the visibility caused by a difference in the aperture ratio can be suppressed. Therefore, the display quality can further be maintained.

FIG. 4B is a plan view which shows a structural example of the sub light shield SLX3 of FIG. 4A.

Sub light shield SLX3 is composed of the first light shielding film SL1 explained with reference to FIG. 2 or the like and the second light shielding film SL2 explained with reference to FIG. 3. Note that the second light shielding film SL2 is depicted in the figure by an alternate long and short dashed line.

The first light shielding film SL1 has a segment SL11 extending in the first direction X between main light shields SLY1 and SLY2 and between main light shields SLY2 and SLY3 and a segment SL12 formed in an island shape between main light shields SLY3 and SLY4. That is, segment SL11 extends in the first direction X between main light shields SLY1 and SLY3 while not extending between main light shields SLY3 and SLY4. Segments SL11 and SL12 overlap contact hole CH3 through which the pixel electrode PE and the relay electrode RE are electrically connected, for example.

The second light shielding film SL2 includes a segment SL21 extending in the first direction X between main light shields SLY3 and SLY4 in addition to main light shields SLY1, SLY2, SLY3 and SLY4. Segment SL21 is connected to main light shields SLY3 and SLY4. Second light shielding film SL2 is intermitted between main light shields SLY1 and SLY2 and between main light shields SLY2 and SLY3.

That is, in the example depicted, sub light shield SLX3 is segment SL11 of the first light shielding film SL1 between main light shield SLY1 and main light shield SLY2 and between main light shield SLY2 and main light shield SLY3 while it is segment SL21 of the second light shielding film SL2 between main light shield SLY3 and main light shield SLY4.

As explained with reference to FIG. 4A, with respect to sub light shield SLX3, segment SL11 has a width W21 between main light shield SLY1 and main light shield SLY2 and has a width W22 between main light shield SLY2 and main light shield SLY3. Furthermore, with respect to sub light shield SLX3, segment SL21 has a width W23 which is greater than each of widths W21 and W22 between main light shield SLY3 and main light shield SLY4.

With sub light shield SLX3 structured as above, a decrease of the area of apertures caused by the arrangement of the spacer SP can be suppressed. Furthermore, the area overlapping contact hole CH3 is light-shielded by the first light shielding film SL1. Thus, even if the gap unevenness or the alignment disorder in the liquid crystal molecules occurs due to the recess of contact hole CH3, the area overlapping contact hole CH3 is not essential for the display, and thus, deterioration of the display quality can be controlled.

FIG. 4C is a plan view which shows a first variation of the light shield SL and the spacer SP.

In the first variation, as compared to the first structural example, a unit pixel UP is composed of four pixels PXW, PXR, PXG, and PXB arranged in the first direction X. The pixel PXW is a white or substantially transparent pixel. Apertures AP are formed to correspond to pixels PXW, PXR, PXG, and PXB, respectively.

Color filters CF1 to CF4 extend in the second direction Y to overlap the apertures AP arranged in the second direction Y. Color filters CF1 to CF4 are arranged in the first direction X in this order. Ends of adjacent color filters overlap the main light shield SLY. In this example, color filter CF1 is white or transparent, color filter CF2 is red, color filter CF3 is green, and color filter CF4 is blue.

The spacer SP is positioned to be opposed to the crossing portion CR of main light shield SLY2 and sub light shield SLX2. The periphery of the spacer SP is light-shielded by an expanded light shield SL covering a relatively large area.

Apertures AP1 and AP2 are shifted to be further distant from the spacer SP along the second direction Y than is aperture AP3. Each of apertures AP1 and AP2 is substantially equal in size to aperture AP3.

Furthermore, apertures AP4 and AP5 are shifted to be further distant from the spacer SP along the second direction Y than is aperture AP6. Each of apertures AP4 and AP5 is substantially equal in size to aperture AP6.

The same advantage obtained from the first structural example can be achieved in the first variation.

Now, a second structural example of the light shield SL will be explained. In the second structural example, as compared to the first structural example, the sub light shields SLX of the light shield SL are formed of the second light shielding film SL2 alone.

FIG. 5A is a plan view which shows the second structural example of the light shield SL and the spacer SP.

The light shield SL includes a plurality of main light shields SLY arranged in the first direction X and a plurality of sub light shields SLX arranged in the second direction Y. The sub light shields SLX are formed of the second light shielding film SL2. In the example depicted, the main light shields SLY are formed of the second light shielding film SL2, too, and are connected to the sub light shields SLX. Colors of pixels and color filters CF1 to CF3 can be selected as in the first structural example.

The following explanation will be given on main light shields SLY1 to SLY4 of the main light shields SLY and sub light shields SLX1 to SLX3 of the sub light shields SLX. Note that the spacer SP is positioned to be opposed to the crossing portion CR of main light shield SLY2 and sub light shield SLX2.

Sub light shield SLX2 has a width W1 along the second direction Y between main light shields SLY1 and SLY2, a width W2 along the second direction Y between main light shields SLY2 and SLY3, and a width W3 along the second direction Y between main light shields SLY3 and SLY4, and widths W1 and W2 are each greater than width W3. Sub light shield SLX1 has a width W11 along the second direction Y between main light shields SLY1 and SLY2, a width W12 along the second direction Y between main light shields SLY2 and SLY3, and a width W13 along the second direction Y between main light shields SLY3 and SLY4, and widths W11 and W12 are each less than width W13. Sub light shield SLX3 has a width W21 along the second direction Y between main light shields SLY1 and SLY2, a width W22 along the second direction Y between main light shields SLY2 and SLY3, and a width W23 along the second direction Y between main light shields SLY3 and SLY4, and widths W21 and W22 are each less than width W23.

Apertures AP1 and AP2 are shifted to be further distant from the spacer SP along the second direction Y than is aperture AP3. Furthermore, apertures AP4 and AP5 are shifted to be further distant from the spacer SP along the second direction Y than is aperture AP6.

The same advantage obtained from the first structural example can be achieved in the second variation.

Figure 5B:
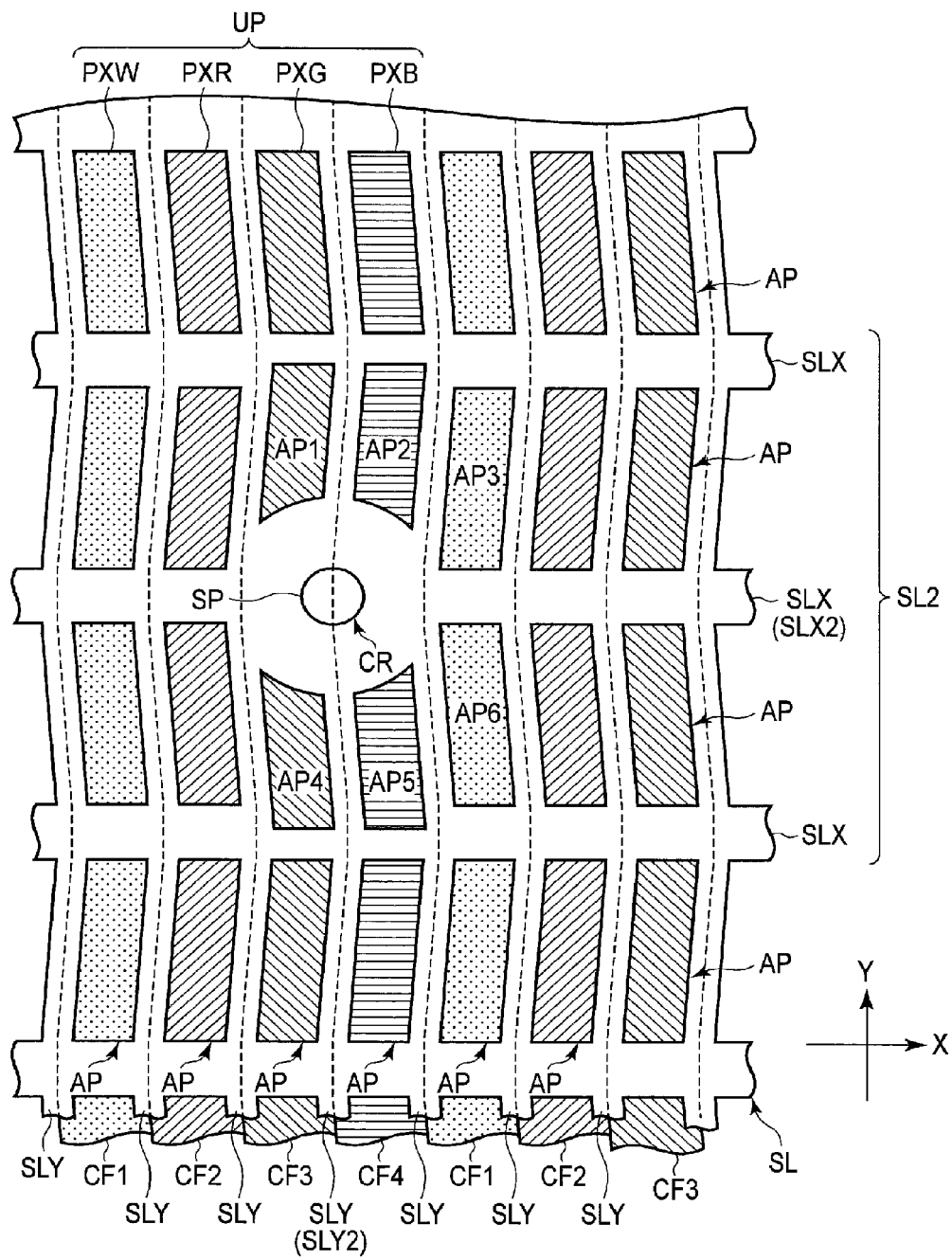
FIG. 5B is a plan view which shows a second variation of the light shield SL and the spacer SP.

FIG. 5B is a plan view which shows a second variation of the light shield SL and the spacer SP.

In the second variation, as compared to the second structural example, a unit pixel UP is composed of four pixels PXW, PXR, PXG, and PXB arranged in the first direction X. Apertures AP are formed to correspond to pixels PXW, PXR, PXG, and PXB, respectively. Colors of pixels and color filters CF1 to CF4 can be selected as in the first structural example. The sub light shields SLX are formed of the second light shielding film SL2. Note that the spacer SP is positioned to be opposed to the crossing portion CR of main light shield SLY2 and sub light shield SLX2.

Apertures AP1 and AP2 are shifted to be further distant from the spacer SP along the second direction Y than is aperture AP3. Each of apertures AP1 and AP2 is substantially equal in size to aperture AP3. Furthermore, apertures AP4 and AP5 are shifted to be further distant from the spacer SP along the second direction Y than is aperture AP6. Each of apertures AP4 and AP5 is substantially equal in size to aperture AP6.

The same advantage obtained from the second structural example can be achieved in the second variation.

Now, a third structural example of the light shield SL will be explained. In the third structural example, as compared to the first structural example, the main light shield is partly narrowed.

Figure 6A:
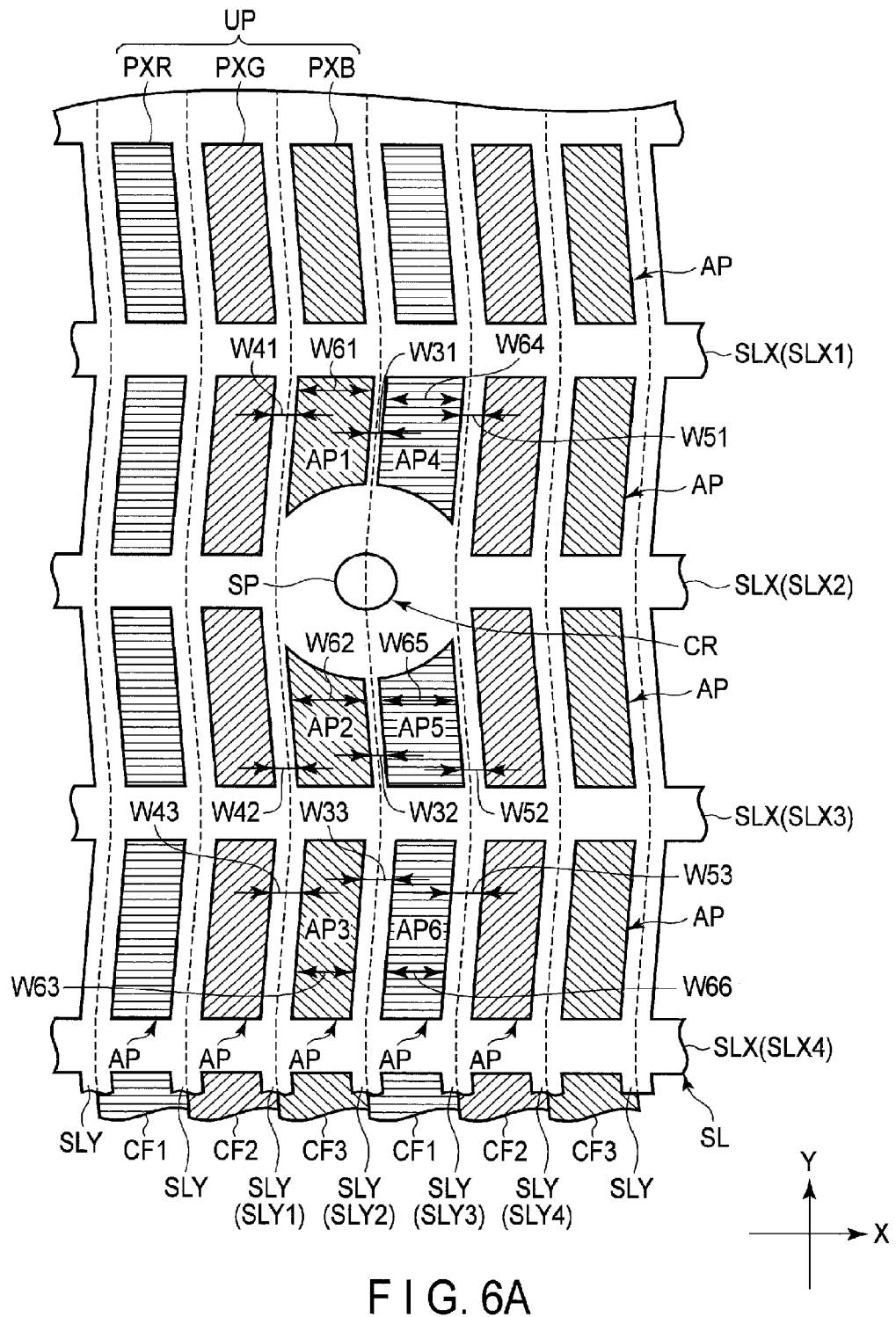
FIG. 6A is a plan view which shows a third structural example of the light shield SL and the spacer SP.

FIG. 6A is a plan view which shows a third structural example of the light shield SL and the spacer SP.

The light shield SL includes a plurality of main light shields SLY arranged in the first direction X and a plurality of sub light shields SLX arranged in the second direction Y. The sub light shields SLX are formed of the second light shielding film SL2. The main light shields SLY and sub light shields SLX are mainly formed of the second light shielding film SL2 but partly of the first light shielding film SL1.

A unit pixel UP is composed of three pixels PXR, PXG, and PXB arranged in the first direction X. Apertures AP are formed to correspond to pixels PXR, PXG, and PXB. Colors of pixels and color filters CF1 to CF3 can be selected as in the first structural example.

Here, the following explanation will be given focusing on main light shields SLY1 to SLY4 of the main light shields SLY and sub light shields SLX1 to SLX4 of the sub light shields SLX. A crossing portion CR of main light shield SLY2 and sub light shield SLX2 is expanded to have a greater area as compared to crossing portions of other main light shields and sub light shields. The spacer is positioned to be opposed to the expanded crossing portion CR.

Main light shield SLY2 is narrowed in the first direction X between sub light shield SLX1 and sub light shield SLX3. That is, main light shield SLY2 has a width W31 along the first direction X between sub light shields SLX1 and SLX2, a width W32 along the first direction X between sub light shields SLX2 and SLX3, and a width W33 along the first direction X between sub light shields SLX3 and SLX4, and widths W31 and W32 are each less than width W33. Note that widths W31 and W32 are substantially equal.

Furthermore, main light shield SLY1 has a width W41 along the first direction X between sub light shields SLX1 and SLX2, a width W42 along the first direction X between sub light shields SLX2 and SLX3, and a width W43 along the first direction X between sub light shields SLX3 and SLX4, and widths W41 and W42 are each less than width W43. Note that widths W41 and W42 are substantially equal. Similarly, main light shield SLY3 has a width W51 along the first direction X between sub light shields SLX1 and SLX2, a width W52 along the first direction X between sub light shields SLX2 and SLX3, and a width W53 along the first direction X between sub light shields SLX3 and SLX4, and widths W51 and W52 are each less than width W53. Note that widths W51 and W52 are substantially equal.

Apertures AP1 to AP3 are arranged in the second direction Y in this order. Aperture AP1 is defined by main light shields SLY1 and LSY2 and sub light shields SLX1 and SLX2. Aperture AP2 is defined by main light shields SLY1 and SLY2 and sub light shields SLX2 and SLX3. Aperture AP3 is defined by main light shields SLY1 and SLY2 and sub light shields SLX3 and SLX4. Aperture AP1 has a width W61 along the first direction X, aperture AP2 has a width W62 along the first direction X, and aperture AP3 has a width W63 along the first direction X, and widths W61 and W62 are each greater than width W63. Note that widths W61 and W62 are substantially equal. Furthermore, each of apertures AP1 and AP2 is substantially equal in size to aperture AP3.

Apertures AP4 to AP6 are arranged in the second direction Y in this order. Aperture AP4 is defined by main light shields SLY2 and LSY3 and sub light shields SLX1 and SLX2. Aperture AP5 is defined by main light shields SLY2 and SLY3 and sub light shields SLX2 and SLX3. Aperture AP6 is defined by main light shields SLY2 and SLY3 and sub light shields SLX3 and SLX4. Aperture AP4 has a width W64 along the first direction X, aperture AP5 has a width W65 along the first direction X, and aperture AP6 has a width W66 along the first direction X, and widths W64 and W65 are each greater than width W66. Note that widths W64 and W65 are substantially equal and are substantially equal to widths W61 and W62, respectively. Furthermore, apertures AP4 and AP5 are each substantially equal in size to aperture AP6. Apertures AP1 to AP6 are substantially equal in size to each other.

That is, in the third structural example, the spacer SP is provided with the expanded crossing portion CR of main light shield SLY2 and sub light shield SLX2 with a light shielding area formed around the spacer SP while apertures around the spacer SP (AP1, AP2, AP4, and AP5 in the example depicted) are formed to be expanded in the first direction to suppress a decrease of the area of the apertures caused by the expanded crossing portion CR.

The same advantage obtained from the first structural example can be achieved in the third structural example. In addition, a decrease of the area of the apertures around the spacer SP can be suppressed and deterioration of the visibility caused by a difference in the aperture ratio can be suppressed. Therefore the display quality can further be maintained.

Figure 6B:
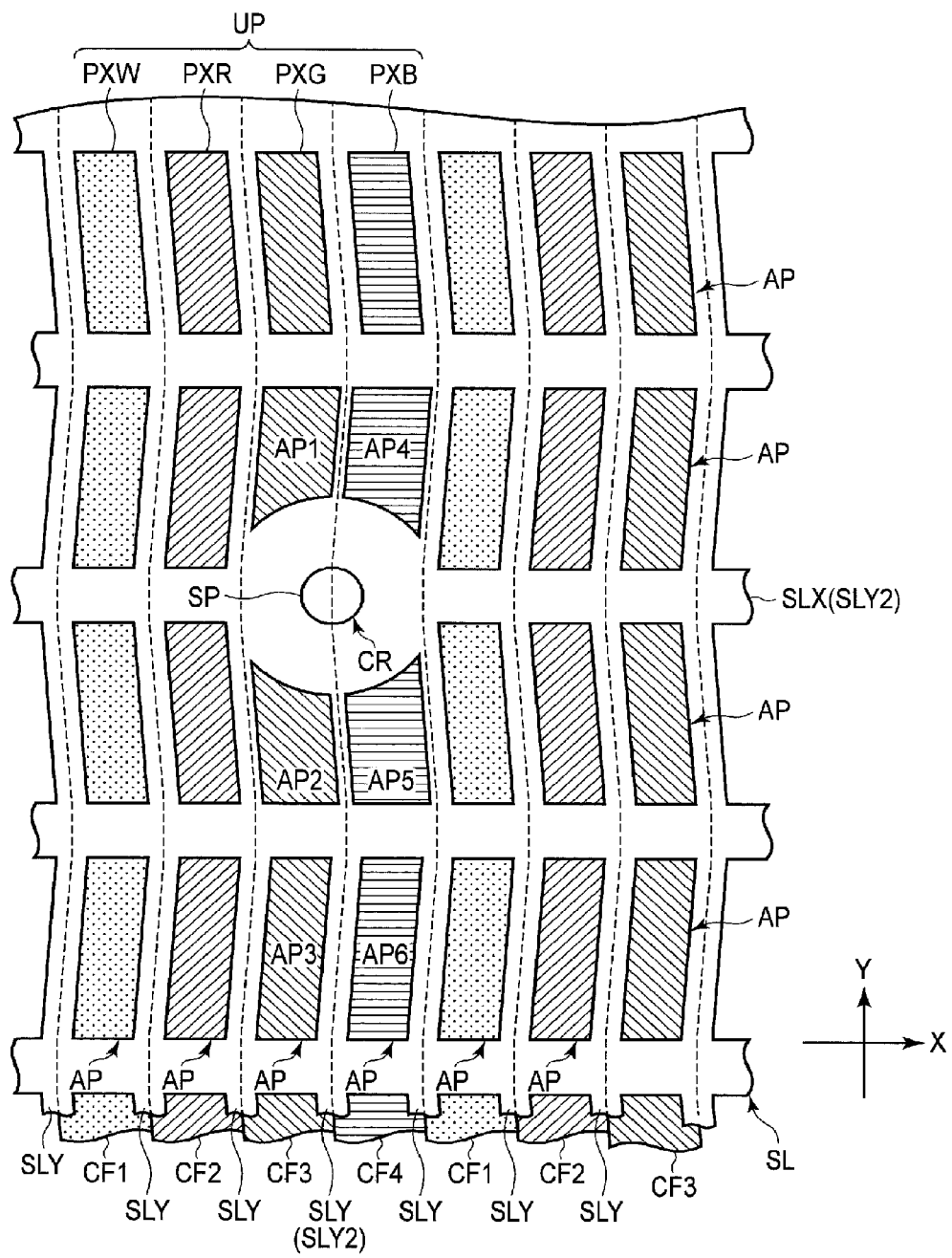
FIG. 6B is a plan view which shows a third variation of the light shield SL and the spacer SP.

FIG. 6B is a plan view which shows a third variation of the light shield SL and the spacer SP.

In the third variation, as compared to the third structural example, a unit pixel UP is composed of four pixels PXW, PXR, PXG, and PXB arranged in the first direction X. Apertures AP are formed to correspond to pixels PXW, PXR, PXG, and PXB, respectively. Colors of pixels and color filters CF1 to CF4 can be selected as in the first variation. The spacer SP is positioned to be opposed to the crossing portion CR of main light shield SLY2 and sub light shield SLX2.

Apertures AP1 and AP2 are enlarged in width along the first direction X than is aperture AP3. Each of apertures AP1 and AP2 is substantially equal in size to aperture AP3. Furthermore, apertures AP4 and AP5 are enlarged in width along the first direction X than is aperture AP6. Each of apertures AP4 and AP5 is substantially equal in size to aperture AP6. That is, apertures AP1 to AP6 are substantially equal in size to each other.

The same advantage obtained from the third structural example can be achieved in the third variation.

Now, a fourth structural example of the light shield SL will be explained.

Figure 7A:
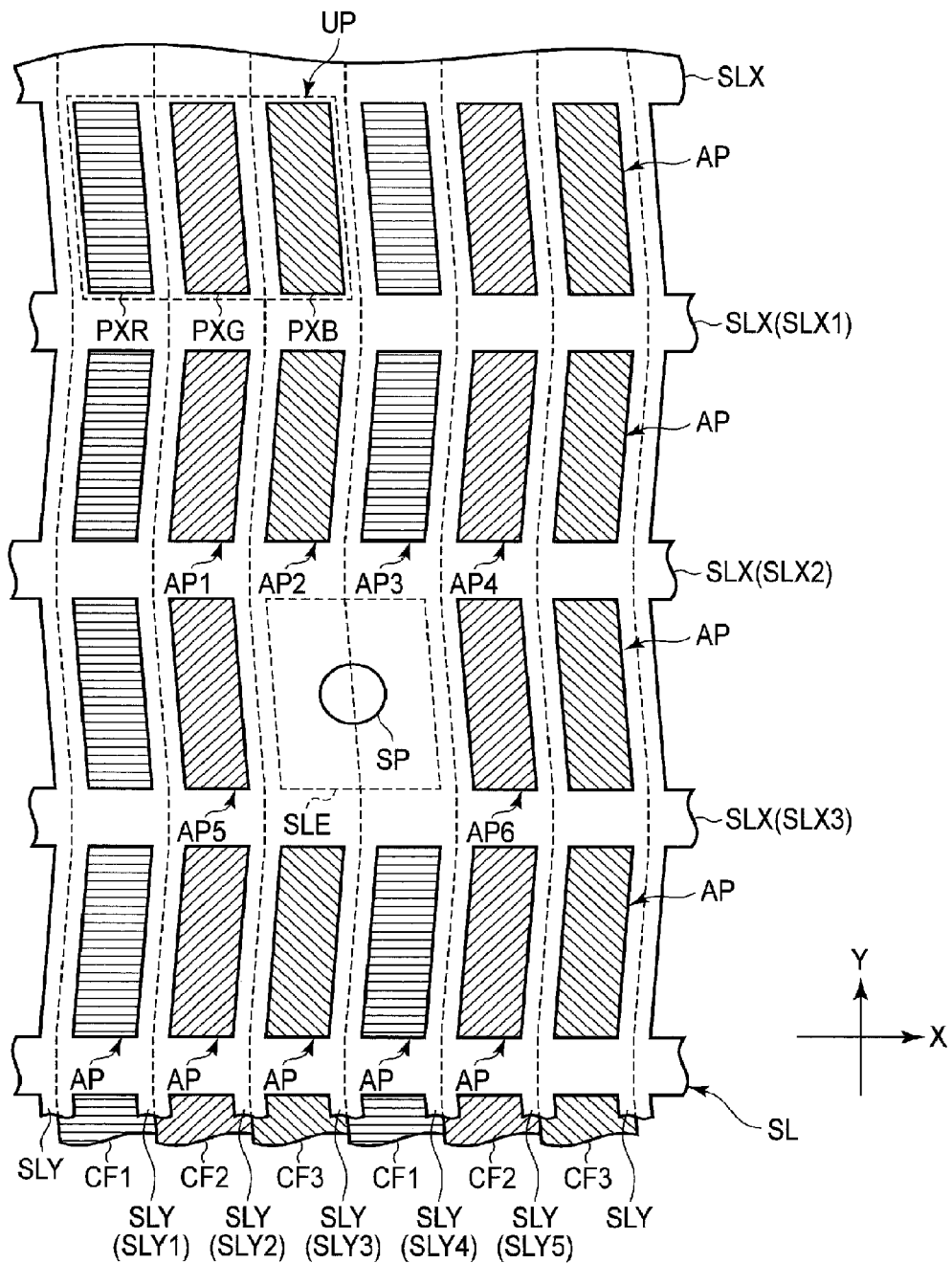
FIG. 7A is a plan view which shows a fourth structural example of the light shield SL and the spacer SP.

FIG. 7A is a plan view which shows the fourth structural example of the light shield SL and the spacer SP.

The light shield SL includes a plurality of main light shields SLY arranged in the first direction X and a plurality of sub light shields SLX arranged in the second direction Y. The main light shields SLY and sub light shields SLX are mainly formed of the second light shielding film SL2 but partly of the first light shielding film SL1. Colors of pixels and color filters CF1 to CF3 can be selected as in the first structural example.

Here, the following explanation will be given focusing on apertures AP1 to AP6 defined by main light shields SLY1 to SLY5 of the main light shields SLY and sub light shields SLX1 to SLX3 of the sub light shields SLX.

Apertures AP1 to AP4 are arranged in the first direction X in this order. Aperture AP1 is defined by main light shields SLY1 and SLY2 and sub light shields SLX1 and SLX2. Aperture AP2 is defined by main light shields SLY2 and SLY3 and sub light shields SLX1 and SLX2. Aperture AP3 is defined by main light shields SLY3 and SLY4 and sub light shields SLX1 and SLX2. Aperture AP4 is defined by main light shields SLY4 and SLY5 and sub light shields SLX1 and SLX2.

Aperture AP5 is arranged next to aperture AP1 in the second direction Y. Aperture AP5 is defined by main light shields SLY1 and SLY2 and sub light shields SLX2 and SLX3. Aperture AP6 is arranged next to aperture AP4 in the second direction Y. Aperture AP6 is defined by main light shields SLY4 and SLY5 and sub light shields SLX2 and SLX3. On the other hand, apertures are not formed next to aperture AP2 or aperture AP3 in the second direction Y. That is, the light shield SL includes an extended part SLE between apertures AP5 and AP6 and in the area next to apertures AP2 and AP3 in the second direction Y. That is, apertures of two adjacent pixels are light-shielded by the light shield SL. In this example, the area light-shielded by the extended part SLE is the area overlapping blue color filter CF3 and red color filter CF1 (that is, the area corresponding to blue and red pixels). Note that apertures of three or more pixels may be light-shielded by the light shield SL.

In the example depicted, the extended part SLE of the light shield SL overlaps color filter CF3 in the area next to second aperture AP2 in the second direction Y and overlaps color filter CF1 in the area next to third aperture AP3 in the second direction Y; however, color filters overlapping with the extended part SLE may be omitted. Here, in order to prepare the extended part SLE and apertures adjacent thereto to form a uniform cell gap, the extended part SLE and color filters should overlap.

The spacer SP is positioned to be opposed to the extended part SLE. That is, the periphery of the position where the spacer SP is disposed is light-shielded over a relatively large area. Thus, even if alignment disorder of liquid crystal molecules may occur around the spacer SP, light leakage caused thereby can be suppressed. Furthermore, a decrease in the contrast ratio caused by the light leakage can be suppressed, too. Therefore, the display quality can be maintained.

Furthermore, in the fourth structural example, as compared to a case where a spacer SP is provided with a crossing portion of a main light shield SLY and an sub light shield SLX, an area of the light shield SL overlapping the spacer SP is not necessarily enlarged locally, and therefore, a consideration to a difference in the aperture ratio between the pixels around the spacer SP and the other pixels is unnecessary.

Furthermore, the spacer SP is provided with the extended part SLE extending in the area corresponding to red and blue pixels. Amongst the primary colors of red, green, and blue, green is most sensible for the eyes. This means that the spacer SP is provided with the light-shielding area of the light shield SL corresponding to pixels of two relatively insensible colors. Therefore, affection to the display quality can be suppressed.

FIG. 7B is a plan view which shows a fourth variation of the light shield SL and the spacer SP.

In the fourth variation, as compared to the fourth structural example, a unit pixel UP is composed of four pixels PXW, PXR, PXG, and PXB arranged in the first direction X. Apertures AP are formed to correspond to pixels PXW, PXR, PXG, and PXB, respectively. Colors of pixels and color filters CF1 to CF4 can be selected as in the first variation.

The light shield SL includes an extended part SLE shields light from apertures of adjacent two pixels. In this example, the extended part SLE extends in the area overlapping green color filter CF3 and blue color filter CF4 (that is, the area corresponding to green and blue pixels). The spacer SP is positioned to be opposed to the extended part SLE.

Furthermore, the spacer SP is provided with the extended part SLE extending in the area corresponding to green and blue pixels. Amongst the four colors of red, green, blue, and white, white is most sensible for the eyes. This means that the spacer SP is provide with the light-shielding area of the light shield SL corresponding to pixels of relatively insensible colors.

The same advantage obtained from the fourth structural example can be achieved in the fourth variation.

Figure 8:
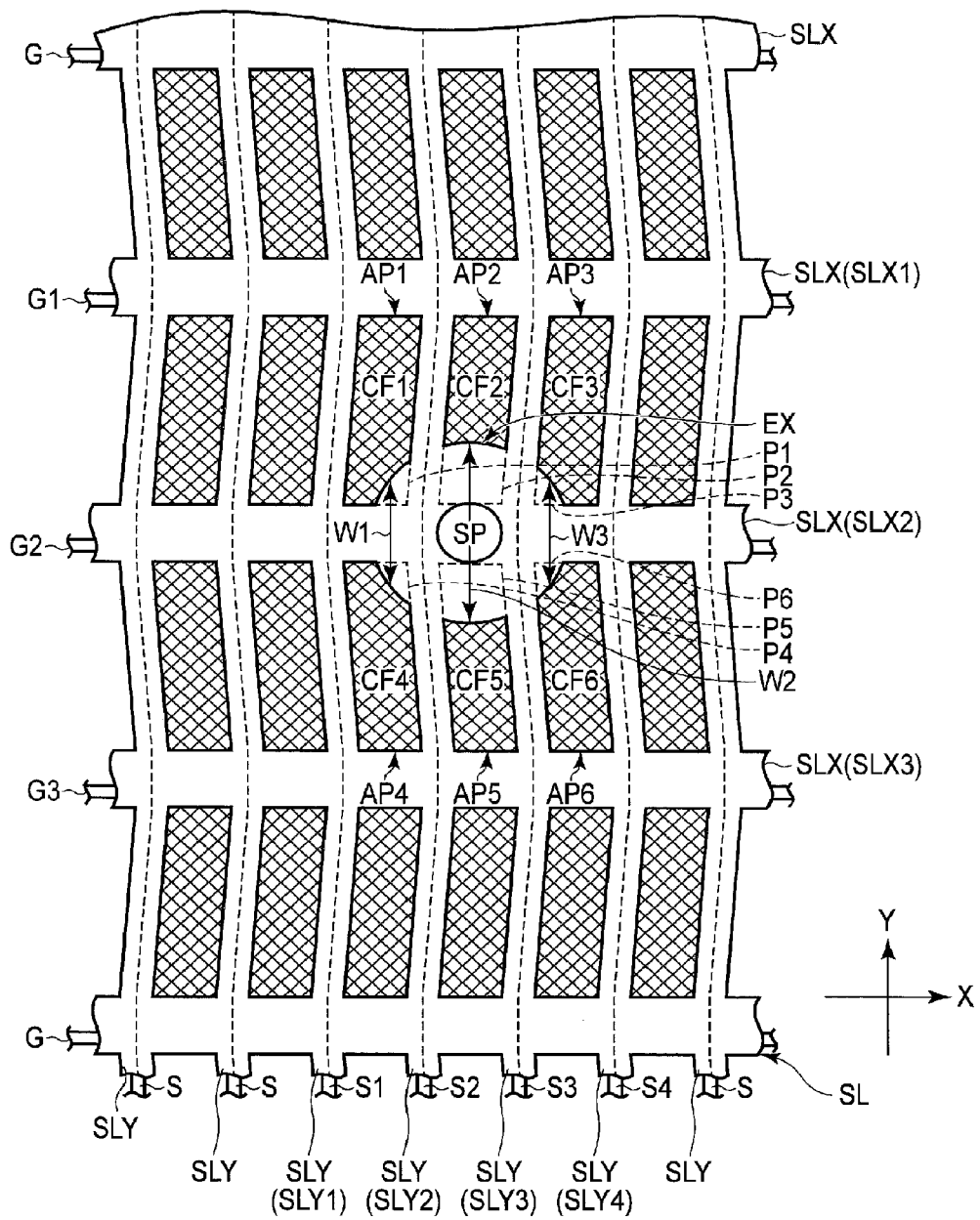
FIG. 8 is a plan view which shows a fifth structural example of the light shield SL and the spacer SP.

FIG. 8 is a plan view which shows the fifth structural example of the light shield SL and the spacer SP.

The light shield SL includes a plurality of main light shields SLY arranged in the first direction X, a plurality of sub light shields SLX arranged in the second direction Y, and a spacer light shield EX. The main light shields SLY, sub light shields SLX, and spacer light shield EX are mainly formed of the second light shielding film SL2 but may at least partially be formed of the first light shielding film SL1. The main light shields SLY are opposed to the source lines S and the sub light shields SLX are opposed to the gate lines G.

Here, the following explanation will be given focusing on main light shields SLY1 to SLY4 of the main light shields SLY, sub light shields SLX1 to SLX3 of the sub light shields SLX, and apertures AP1 to AP6. Main light shields SLY1 to SLY4 are opposed to source lines S1 to S4 arranged in the first direction X in this order, respectively. Sub light shields SLX1 to SLX3 are opposed to gate lines G1 to G3 arranged in the second direction Y in this order, respectively.

Sub light shields SLX1 to SLX3 and main light shields SLY1 to SLY4 are crossed. Main light shields SLY1 to SLY4 have substantially the same width along the first direction X. Sub light shields SLX1 to SLX3 have substantially the same width along the second direction Y.

The spacer light shield EX is disposed around the spacer SP. In this example, in the X-Y plane, the spacer SP is disposed between the source lines S2 and S3 and overlaps gate line G2. The spacer light shield EX extends isotropically with the spacer SP as its center.

The spacer light shields EX includes at least three parts P1 to P3. Part P1 is formed integrally with main light shield SLY2 and sub light shield SLX2 between main light shields SLY1 and SLY2. Part P2 is formed integrally with main light shields SLY2 and SLY3 and sub light shield SLX2 between main light shields SLY2 and SLY3. Part P3 is formed integrally with main light shield SLY3 and sub light shield SLX2 between main light shields SLY3 and SLY4. In the example depicted, parts P1 to P3 are positioned closer to gate line G1 with reference to gate line G2.

The spacer light shield EX in the figure further includes three parts P4 to P6. Parts P4 to P6 are positioned closer to gate line G3 with reference to gate lines G2. Part P4 is formed integrally with main light shield SLY2 and sub light shield SLX2 between main light shields SLY1 and SLY2. Part P5 is formed integrally with main light shields SLY2 and SLY3 and sub light shield SLX2 between main light shields SLY2 and SLY3. Part P6 is formed integrally with main light shield SLY3 and sub light shield SLX2 between main light shields SLY3 and SLY4. Parts P1 to P6 form a substantially circular area including main light shields SLY2 and SLY3 and sub light shield SLX2.

Apertures AP1 to AP3 are arranged in the first direction X in this order. Aperture AP1 is defined by main light shields SLY1 and SLY2 and sub light shields SLX1 and SLX2. Aperture AP2 is defined by main light shields SLY2 and SLY3 and sub light shields SLX1 and SLX2. Aperture AP3 is defined by main light shields SLY3 and SLY4 and sub light shields SLX1 and SLX2. Part P1 overlaps a substantially triangular area of aperture AP1 in the proximity of the spacer SP. Part P2 overlaps a substantially quadrangular area of aperture AP2 in the proximity of the spacer SP. Part P3 overlaps a substantially triangular area of aperture AP3 in the proximity of the spacer SP. In this example, part P2 is larger than each of parts P1 and P3.

Apertures AP4 to AP6 are arranged in the first direction X in this order. Aperture AP4 is arranged next to aperture AP1 in the second direction Y. Aperture AP4 is defined by main light shields SLY1 and SLY2 and sub light shields SLX2 and SLX3. Aperture AP5 is arranged next to aperture AP2 in the second direction Y. Aperture AP5 is defined by main light shields SLY2 and SLY3 and sub light shields SLX2 and SLX3. Aperture AP6 is arranged next to aperture AP3 in the second direction Y. Aperture AP6 is defined by main light shields SLY3 and SLY4 and sub light shields SLX2 and SLX3. Part P4 overlaps a substantially triangular area of aperture AP4 in the proximity of the spacer SP. Part P5 overlaps a substantially quadrangular area of aperture AP5 in the proximity of the spacer SP. Part P6 overlaps a substantially triangular area of aperture AP6 in the proximity of the spacer SP. In this example, part P5 is larger than each of parts P4 and P6.

Apertures AP1 to AP6 are each formed in a quadrangular shape and are substantially equal in size; however, as mentioned above, they overlap parts P1 to P6 of the spacer light shield EX, respectively, and thus, they are practically different in size. In this example, apertures AP1 and AP4 have substantially the same size, apertures AP2 and AP5 have substantially the same size, and apertures AP3 and AP6 have substantially the same size. Aperture AP2 is smaller than apertures AP1 and AP3. The size relationship between apertures AP1 to AP6 will differ based on the position of the spacer SP or the position of the spacer light shield EX. Furthermore, the display panel PNL may include sub spacers in addition to the spacers used to form the cell gap, and the sub spacers are formed to have a height less than the cell gap in a regular state. If a spacer light shield is disposed around the sub spacer, the size relationship between apertures AP1 to AP6 may be different from that of the example depicted here.

Color filters CF1 to CF6 are arranged to correspond to apertures AP1 to AP6, respectively. In this example, color filters arranged in series in the second direction Y have the same color. For example, color filters CF1 and CF4 are green, color filters CF2 and CF5 are blue, and color filters CF3 and CF6 are red. In another example, color filters arranged in series in the second direction Y have different colors. For example, color filters CF1 and CF6 are green, color filters CF2 and CF4 are red, and color filters CF3 and CF5 are blue.

From a different standpoint, the spacer light shield EX may be interpreted as the sub light shield SLX2 which is locally expanded. Sub light shield SLX2 is positioned between apertures AP1 to AP3 and apertures AP4 to AP6. Sub light shield SLX2 is expanded along the second direction Y between main light shields SLY2 and SLY3 to form parts P2 and P5. Furthermore, sub light shield SLX2 is expanded along the second direction Y at the side closer to the spacer SP between main light shields SLY1 and SLY2 to form parts P1 and P4. Sub light shield SLX2 is expanded along the second direction Y at the side closer to the spacer SP between main light shields SLY3 and SLY4 to form parts P3 and P6. Sub light shield SLX2 has a width W1 between main light shields SLY1 and SLY2, a width W2 between main light shields SLY2 and SLY3, and a width W3 between main light shields SLY3 and SLY4. Width W2 is greater than each of widths W1 and W3.

The spacer SP is opposed to the spacer light shield EX. That is, the periphery of the position where the spacer SP is disposed is light-shielded over a relatively large area. Thus, even if alignment disorder of liquid crystal molecules may occur around the spacer SP, light leakage caused thereby can be suppressed. Furthermore, a decrease in the contrast ratio caused by the light leakage can be suppressed, too. Therefore, the display quality can be maintained.

Note that, if color filters of different colors are arranged to correspond to the apertures in the second direction Y, color filters CF2 and CF5 that are arranged in the second direction Y with the spacer SP interposed therebetween should be of a color other than green. For example, the spacer SP is disposed between red color filter CF2 and blue color filter CF5. The spacer SP is provided with the spacer light shield EX extending to correspond to pixels of relatively insensible two colors. Therefore, affection to the display quality can be suppressed.

FIG. 9 is a cross-sectional view which schematically shows the structure of an array substrate AR opposed to the spacer SP of FIG. 8. In the figure, only essential elements for the explanation are shown where pixel electrodes PE1 to PE3 are depicted in dotted lines and the light shield SL is depicted in an alternate long and short dashed line.

Switching elements SW1 to SW3 are arranged in the first direction X. Switching element SW1 is electrically connected to gate line G2 and source line S1. Switching element SW1 includes relay electrode RE1 between source lines S1 and S2. Switching element SW2 is electrically connected to gate line G2 and source line S2. Switching element SW2 includes relay electrode RE2 between source lines S2 and S3. Switching element SW3 is electrically connected to gate line G2 and source line S3. Switching element SW3 has relay electrode RE3 between source lines S3 and S4.

Relay electrodes RE1 and RE3 are arranged on the same straight line along the first direction X. Relay electrode RE2 is disposed between relay electrodes RE1 and RE3 and extends in the direction to be distant from gate line G2 longer than relay electrodes RE1 and RE3. Contact hole CH31 used for the connection of relay electrode RE1 and pixel electrode PE1 and contact hole CH33 used for the connection of relay electrode RE3 and pixel electrode PE3 are arranged on the same straight line along the first direction X. Contact hole CH32 used for the connection of relay electrode RE2 and pixel electrode PE2 is located to be distant from gate line G2 than are contact holes CH31 and CH33. Furthermore, in the X-Y plane, contact hole CH32 overlaps part P2 of the light shield SL.

The spacer SP is disposed between source lines S2 and S3 while it partly overlaps relay electrode RE32 in the X-Y plane. Furthermore, the spacer SP does not overlap contact hole CH32 in the X-Y plane. Thus, the spacer SP does not fall in contact hole CH32 and a desired cell gap can be achieved.

Figure 10:
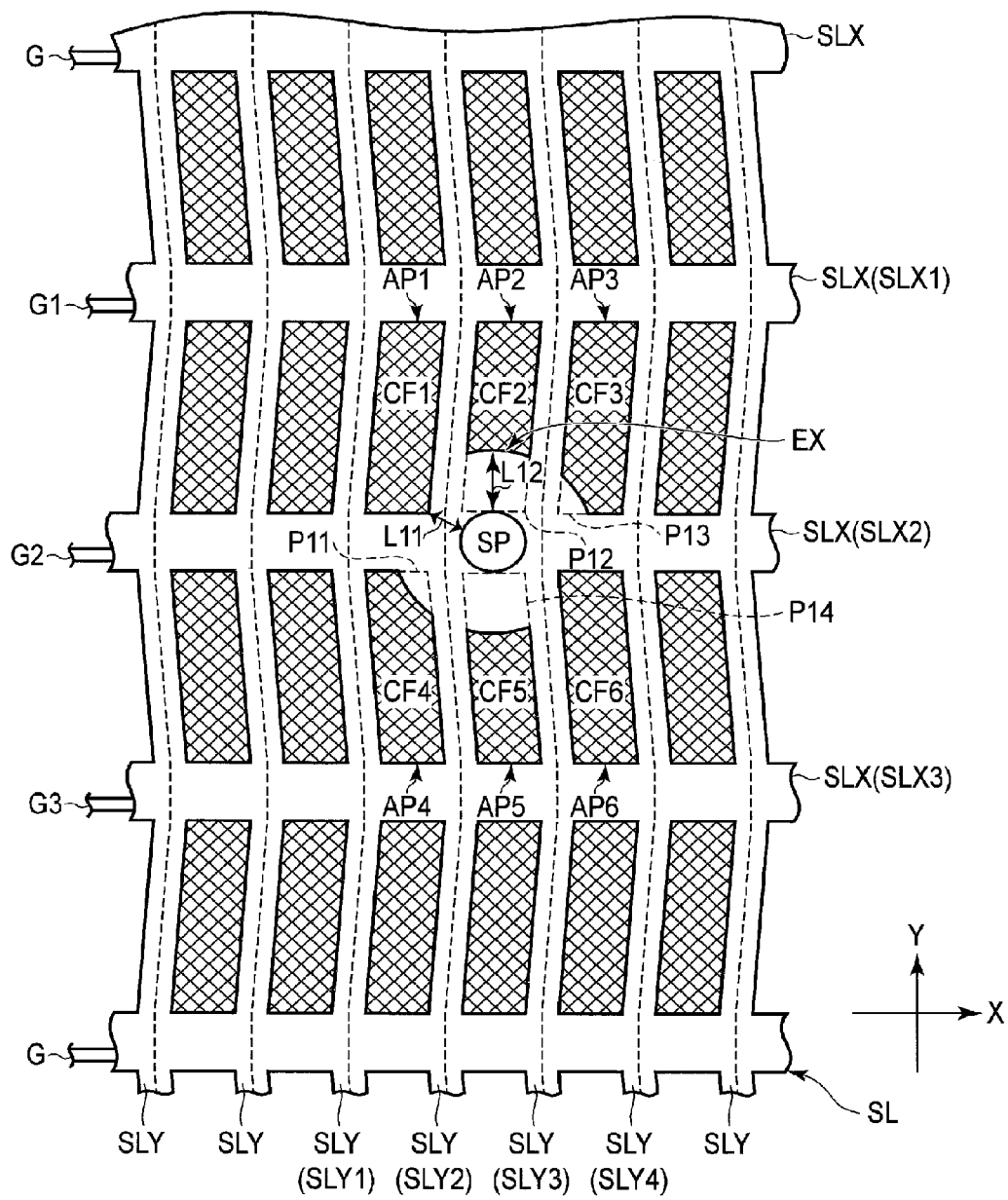
FIG. 10 is a plan view which shows a sixth structural example of the light shield SL and the spacer SP.

FIG. 10 is a plan view which shows a sixth structural example of the light shield SL and the spacer SP.

In the sixth structural example of FIG. 10, as compared to the fifth structural example of FIG. 8, the shape of the spacer light shield EX is different. In the example depicted, the spacer light shield EX includes four parts P11 to P14. Part P11 corresponds to part P4, part P12 corresponds to part P2, part P13 corresponds to part P3, and part P14 corresponds to part P5. Part P11 is disposed between main light shields SLY1 and SLY2. Parts P12 and P14 are disposed between main light shields SLY2 and SLY3. Part P13 is disposed between main light shields SLY3 and SLY4. Parts P12 and P13 are disposed to be closer to gate line G1 with reference to gate line G2. Parts P11 and P14 are disposed to be closer to gate line G3 with reference to gate line G2. The spacer SP is disposed between parts P12 and P14.

In the example depicted, a first gap L11 between the spacer SP and aperture AP1 is shorter than a second gap L12 between the spacer SP and aperture AP2. Furthermore, a gap between the spacer SP and aperture AP3, a gap between the spacer SP and aperture AP4, and a gap between the spacer SP and aperture AP5 are each equal to the second gap L12. A gap between the spacer SP and aperture AP6 is equal to the first gap L11. Amongst apertures AP1 to AP6 around the spacer SP, apertures AP1 and AP6 are the largest and apertures AP2 and AP5 are the smallest. Aperture AP3 is larger than aperture AP2 but smaller than aperture AP1. Aperture AP4 is larger than aperture AP5 but smaller than aperture AP6.

Color filters CF1 to CF6 are arranged to correspond to apertures AP1 to AP6, respectively. In this example, color filters CF1 and CF6 are green, color filters CF2 and CF4 are red, and color filters CF3 and CF5 are blue.

The same advantage obtained from the fifth structural example can be achieved in the sixth structural example. In addition, the spacer light shield EX is not formed to overlap the apertures corresponding to green color filters which are relatively visible for the eyes but formed to overlap the apertures corresponding to red and blue color filters which are relatively insensible for the eyes, and thus, affection to the display quality can further be suppressed.

Figure 11:
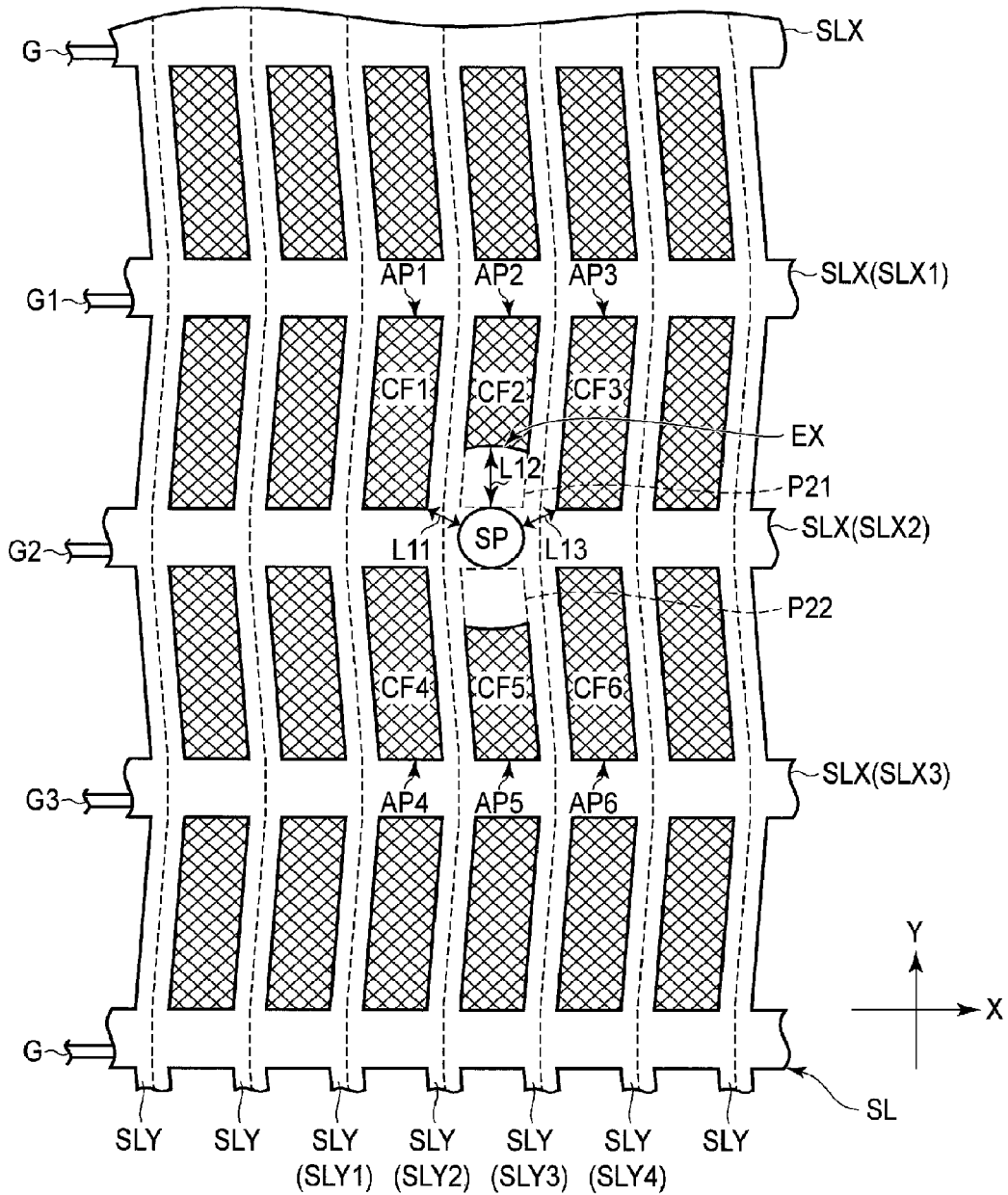
FIG. 11 is a plan view which shows a seventh structural example of the light shield SL and the spacer SP.

FIG. 11 is a plan view which shows a seventh structural example of the light shield SL and the spacer SP.

In the seventh structural example of FIG. 11, as compared to the sixth structural example of FIG. 10, the shape of the spacer light shield EX is different. In the example depicted, the spacer light shield EX includes two parts P21 and P22. Part P21 corresponds to part P2, and part P22 corresponds to part P5. Parts P21 and P22 are disposed between main light shields SLY2 and SLY3. Part P21 is disposed to be closer to gate line G1 with reference to gate line G2. Part P22 is disposed to be closer to gate line G3 with reference to gate line G2. The spacer SP is disposed between parts P21 and P22.

In the example depicted, a first gap L11 is shorter than a second gap L12 as in the sixth structural example, and in addition thereto, a third gap L13 between the spacer SP and aperture AP3 is shorter than the second gap L12. The first gap L11 is equal to the third gap L13. Furthermore, a gap between the spacer SP and aperture AP4 and a gap between the spacer SP and aperture AP6 are each equal to the first gap L11. Furthermore, a gap between the spacer SP and aperture AP5 is equal to the second gap L12. Amongst six apertures AP1 to AP6 around the spacer SP, apertures AP1, AP3, AP4, and AP6 are the largest and apertures AP2 and AP5 are the smallest.

Color filters CF1 to CF6 are arranged to correspond to apertures AP1 to AP6, respectively. In this example, color filters CF1 and CF6 are green, color filters CF2 and CF4 are red, and color filters CF3 and CF5 are blue.

The same advantage obtained from the sixth structural example can be achieved in the seventh structural example. In addition, the spacer light shield EX is formed to overlap two apertures AP2 and AP5 which are arranged in the second direction Y with the spacer SP interposed therebetween, and thus, affection to the display quality can further be suppressed.

Figure 12:
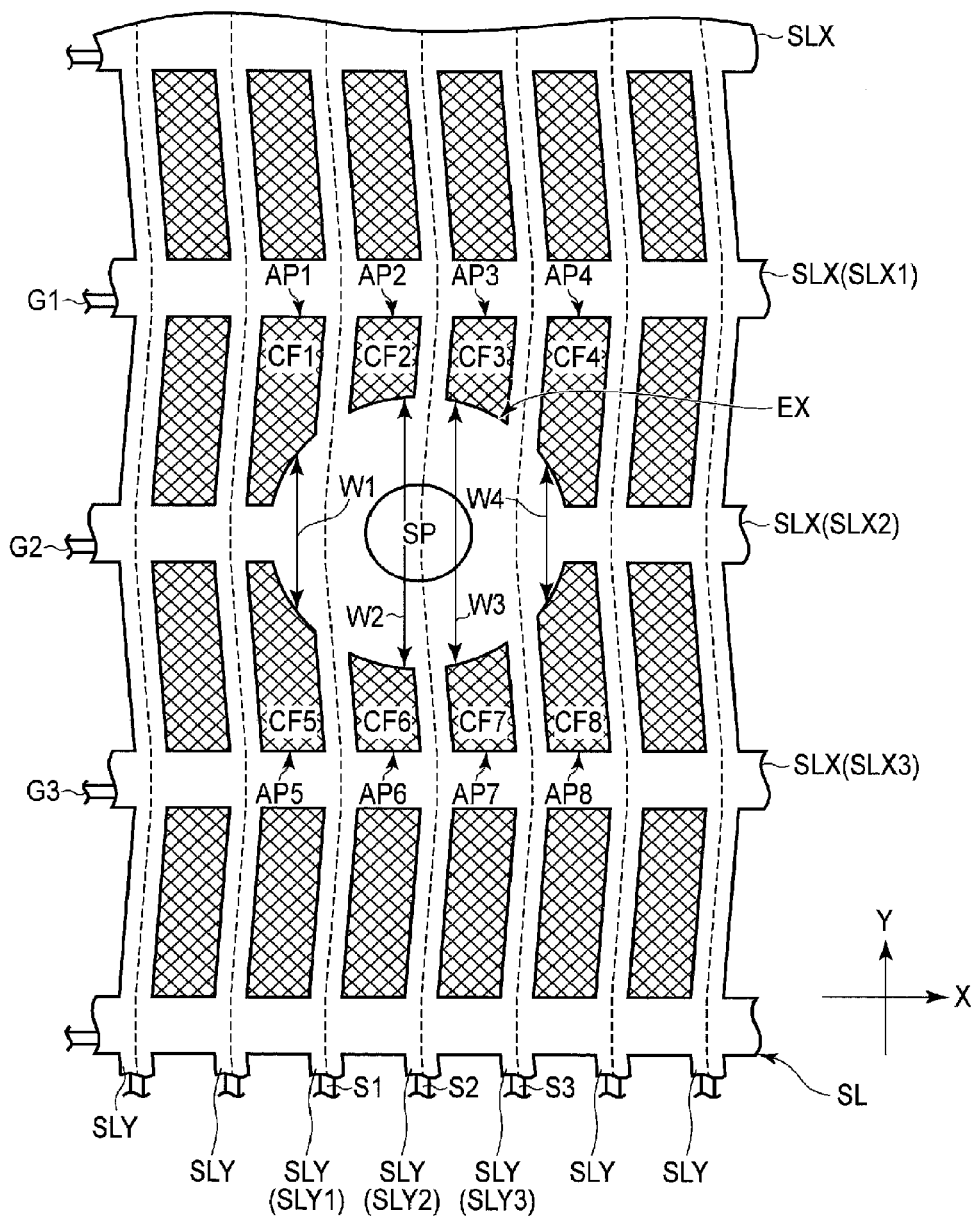
FIG. 12 is a plan view which shows an eighth structural example of the light shield SL and the spacer SP.

FIG. 12 is a plan view which shows an eighth structural example of the light shield SL and the spacer SP.

The following explanation of the eighth structural example will be given focusing on main light shields SLY1 to SLY3 of the main light shields SLY arranged in the first direction X, sub light shields SLX1 to SLX3 of the sub light shields SLX arranged in the second direction Y, and apertures AP1 to AP8.

Sub light shields SLX1 to SLX3 and main light shields SLY1 to SLY3 are crossed. Main light shields SLY1 to SLY3 have substantially the same width. Sub light shields SLX1 to SLX3 have substantially the same width.

In the example depicted, in the X-Y plane, the spacer SP overlaps a crossing portion of gate line G2 and source line S2. The spacer light shield EX extends isotropically with the spacer SP as its center. Although this is not detailed, the spacer light shield EX is partly formed integrally with main light shields SLY1 and SLY3 and sub light shield SLX2.

Apertures AP1 to AP4 are arranged in the first direction X in this order. Apertures AP5 to AP8 are arranged next to apertures AP1 to AP4, respectively, in the second direction Y. Sub light shield SLX2 is disposed between apertures AP1 to AP4 and apertures AP5 to AP8. Main light shield SLY1 is disposed between apertures AP1 and AP2 and between apertures AP5 and AP6. Main light shield SLY2 is disposed between apertures AP2 and AP3 and between apertures AP6 and AP7. Main light shield SLY3 is disposed between apertures AP3 and AP4 and between apertures AP7 and AP8.

If the spacer light shield EX is considered as a part of sub light shield SLX2, sub light shield SLX2 has a width W1 along the second direction Y between apertures AP1 and AP5, width W2 along the second direction Y between apertures AP2 and AP6, width W3 along the second direction Y between apertures AP3 and AP7, and width W4 along the second direction Y between apertures AP4 and AP8. Width W2 is greater than width W1, and width W3 is greater than width W4.

Color filters CF1 to CF8 are arranged to correspond to apertures AP1 to AP8, respectively. In this example, color filters arranged in the second direction Y have the same color. For example, color filters CF1, CF4, CF5, and CF8 are green, color filters CF2 and CF6 are blue, and color filters CF3 and CF7 are red.

Since the spacer SP is opposed to the spacer light shield EX, the advantages obtained from the fifth structural example can be achieved in this example.

FIG. 13 is a plan view which shows a ninth structural example of the light shield SL and the spacer SP.

In the ninth structural example of FIG. 13, as compared to the eighth structural example of FIG. 12, the shape of the spacer light shield EX is different. Focusing on gaps between the spacer SP and peripheral apertures, a first gap L21 between the spacer SP and aperture AP1 is shorter than a second gap L22 between the spacer SP and aperture AP2. Gaps between the spacer SP and aperture AP3, between the spacer SP and aperture AP6, between the spacer SP and aperture AP7 are equal to the second gap L22. Furthermore, gaps between the spacer SP and aperture AP4, between the spacer SP and aperture AP5, and between the spacer SP and aperture AP8 are equal to the first gap L21. Amongst apertures AP1 to AP8 around the spacer SP, apertures AP1, AP4, AP5, and AP8 are the largest and apertures AP2, AP3, AP6, and AP7 are the smallest. In this example, color filters CF1 and CF6 are green, color filters CF2 and CF4 are red, and color filters CF3 and CF5 are blue.

The same advantage obtained from the fifth structural example can be achieved in the ninth structural example. In addition, the spacer light shield EX is not formed to overlap the apertures corresponding to green color filters which are relatively visible for the eyes but formed to overlap the apertures corresponding to red and blue color filters which are relatively insensible for the eyes, and thus, affection to the display quality can further be suppressed.

The first to ninth structural examples can arbitrarily be combined, and the first to fourth variations can arbitrarily be combined.

In the first to ninth structural examples and the first to fourth variations, the unit pixel UP is composed of three or four color pixels arranged in the first direction X; however, the structure of the unit pixel UP is not limited thereto. Other structures of the unit pixel PX are exemplified below.

FIG. 14 shows another structure of the unit pixel UP.

In this example, the unit pixel UP is composed of pixels PXR1, PXG1, PXB, PXR2, PXG2, and PXW. Pixels PXR1, PXG1, and PXB are arranged in the first direction X. Pixels PXR2, PXG2, and PXW are arranged in the first direction X. Pixels PXR1 and PXR2 are arranged in the second direction Y and both are, for example, red pixels. Pixels PXG1 and PXG2 are arranged in the second direction Y and both are, for example, green pixels. Pixels PXB and PXW are arranged in the second direction Y and, for example, pixel PXB is a blue pixel and pixel PXW is a white pixel. Note that, in the figure, color pixels of the same color are hatched the same for clear identification.

FIG. 15 shows still another structure of the unit pixel UP.

In this example, the unit pixel UP is composed of pixels PXR1, PXG1, PXB, PXR2, PXG2, and PXW. Pixels PXR1 and PXG1 are arranged in the second direction Y, and pixels PXR1 and PXG1 and pixel PXB are arranged in the first direction X. Pixels PXR2 and PXG2 are arranged in the second direction Y, and pixels PXR2 and PXG2 and pixel PXW are arranged in the first direction X. Pixels PXR1 and PXR2 are arranged in the second direction Y and both are, for example, red pixels. Pixels PXG1 and PXG2 are arranged in the second direction Y and both are, for example, green pixels. Pixels PXB and PXW are arranged in the second direction Y, and, for example, pixel PXB is a blue pixel and pixel PXW is a white pixel. Note that, in the figure, color pixels of the same color are hatched the same for clear identification.

FIG. 16 shows still another structure of the unit pixel UP.

In this example, the unit pixel UP is composed of three kinds of pixels arranged in the first direction X including red pixels PXR, green pixels PXG, and blue pixels PXB. In the unit pixel UP, three pixels PXR, PXG, and PXB are arranged in this order in the first row, three pixels PXB, PXR, and PXG are arranged in this order in the second row, three pixels PXG, PXB, and PXR are arranged in this order in the third row, and three pixels PXB, PXR, and PXG are arranged in this order in the fourth row. Note that, in the figure, color pixels of the same color are hatched the same for clear identification.

The light shields SL explained in the first to ninth structural examples and in the first to fourth variations can be applied to the unit pixels UP of the examples of FIGS. 14 to 16, and the area in which the spacer SP is provided can be formed without causing a decrease in the display quality.

As can be understood from the above, the present embodiments can present a liquid crystal display device which can suppress a decrease in the display quality.

Other examples of the liquid crystal display device achieved from the structures disclosed in this specification are noted below.

(1) A liquid crystal display device comprising:
a first substrate;
a second substrate opposed to the first substrate;
a liquid crystal layer held between the first substrate and the second substrate;
a first main light shield, a second main light shield, and a third main light shield arranged in series in a first direction;
a first sub light shield and a second sub light shield arranged in series in a second direction crossing the first direction; and
a spacer disposed in a position opposed to a crossing portion of the first main light shield and the first sub light shield, the spacer located between the first substrate and the second substrate, wherein
the first sub light shield has a width along the second direction which is wider between the first main light shield and the second main light shield than between the second main light shield and the third main light shield, and the second sub light shield has a width along the second direction which is narrower between the first main light shield and the second main light shield than between the second main light shield and the third main light shield.

(2) The liquid crystal display device of (1), further comprising:
a first aperture defined by the first and second main light shields and the first and second sub light shields; and
a second aperture defined by the second and third main light shields and the first and second sub light shields, wherein
the first aperture is shifted to be distant from the spacer than is the second aperture.

(3) The liquid crystal display device of (1) or (2), wherein the second sub light shield includes a first light shielding film formed on the first substrate and a second light shielding film formed on the second substrate,
the first light shielding film extends in the first direction between the first and second main light shields, and
the second light shielding film extends in the first direction between the second and third main light shields while being intermitted between the first and second main light shields.

(4) The liquid crystal display device of (1) or (2), wherein the second sub light shield includes a second light shielding film formed on the second substrate, and
the second light shielding film has a width along the second direction which is narrower between the first and second main light shields than between the second and third main light shields.

(5) A liquid crystal display device comprising:
a first substrate;
a second substrate opposed to the first substrate;
a liquid crystal layer held between the first substrate and the second substrate;
a first main light shield and a second main light shield arranged in series in a first direction;
a first sub light shield, a second sub light shield, and a third sub light shield arranged in series in a second direction crossing the first direction; and
a spacer disposed in a position opposed to a crossing portion of the first main light shield and the first sub light shield, the spacer located between the first substrate and the second substrate, wherein
the first main light shield has a width along the first direction which is narrower between the first sub light shield and the second sub light shield than between the second sub light shield and the third sub light shield.

(6) The liquid crystal display device of (5), wherein the second main light shield has a width along the first direction which is narrower between the first and second sub light shields than the second and third sub light shields.

(7) The liquid crystal display device of (5) or (6), further comprising:
a first aperture defined by the first and second main light shields and the first and second sub light shields; and
a second aperture defined by the first and second main light shields and the second and third sub light shields, wherein
the first aperture has a width along the first direction which is wider than a width along the first direction of the second aperture.

(8) A liquid crystal display device, comprising:
a first substrate;
a second substrate opposed to the first substrate;
a liquid crystal layer held between the first substrate and the second substrate;
a light shield which defines first to fourth apertures arranged in series in a first direction and defines a fifth aperture arranged next to the first aperture in a second direction and a sixth aperture arranged next to the fourth aperture in the second direction, the light shield including an extended part which extends in an area between the fifth and sixth apertures to be next to the second and third apertures in the second direction; and
a spacer disposed in a position opposed to the extended part while being located between the first and second substrates.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A liquid crystal display device comprising:
a first substrate including:
a plurality of source lines including a first source line, a second source line, a third source line, and a fourth source line arranged in series in a first direction, and
a plurality of gate lines including a first gate line, a second gate line, and a third gate line arranged in series in a second direction;
a second substrate opposed to the first substrate;
a liquid crystal layer held between the first substrate and the second substrate;

a plurality of main light shields including a first main light shield, a second main light shield, a third main light shield, and a fourth main light shield opposed to the plurality of source lines, respectively;
a sub light shield crossing the plurality of main light shields to be opposed to the second gate line;
a spacer disposed between the second source line and the third source line; and
a spacer light shield disposed around the spacer and extending isotropically from a center of the spacer,
wherein the spacer light shield includes:
  a first part formed integrally with the second main light shield and the sub light shield between the first main light shield and the second main light shield that are adjacent to each other,
  a second part formed integrally with the second main light shield, the third main light shield, and the sub light shield between the second main light shield and the third main light shield that are adjacent to each other, and
  a third part formed integrally with the third main light shield and the sub light shield between the third main light shield and the fourth main light shield that are adjacent to each other,
wherein the spacer is located in a center between the second source line and the third source line that are adjacent to each other, and does not overlap the source lines,
the first part is distant from the first main light shield, and the third part is distant from the fourth main light shield;
a greatest width of the second part along the second direction is greater than a greatest width of the first part along the second direction and a greatest width of the third part along the second direction;
a first relay electrode disposed between the first source line and the second source line that are adjacent to each other;
a second relay electrode disposed between the second source line and the third source line that are adjacent to each other; and
a third relay electrode disposed between the third source line and the fourth source line that are adjacent to each other,
wherein the first relay electrode, the second relay electrode, and the third relay electrode are electrically connected to the second gate line,
an end portion on the first gate line side of the first relay electrode and an end portion on the first gate line side of the third relay electrode are arranged on a same straight line along the first direction, and
an end portion on the first gate line side of the second relay electrode extends longer than the end portion on the first gate line side of the first relay electrode in a direction to be distant form the second gate line.

2. The liquid crystal display device of claim 1, further comprising:
a first pixel electrode electrically connected to the first relay electrode through a first contact hole;
a second pixel electrode electrically connected to the second relay electrode through a second contact hole;
a third pixel electrode electrically connected to the third relay electrode through a third contact hole;
a first semiconductor layer connected to the first relay electrode through a fourth contact hole;
a second semiconductor layer connected to the second relay electrode through a fifth contact hole; and
a third semiconductor layer connected to the third relay electrode through a sixth contact hole,
wherein the first contact hole and the third contact hole are arranged on a same straight line along the first direction,
the second contact hole is disposed to be distant from the second gate line farther than the first contact hole,
the first contact hole is located between the fourth contact hole and the second gate line in the second direction,
the third contact hole is located between the sixth contact hole and the second gate line in the second direction, and
the fifth contact hole is located between the second contact hole and the second gate line in the second direction.

3. The liquid crystal display device of claim 2, wherein the spacer partly overlaps the second relay electrode and the fifth contact hole and does not overlap the second contact hole in a plan view.

4. The liquid crystal display device of claim 3, wherein the second contact hole overlaps the second part in a plan view.

5. The liquid crystal display device of claim 4, wherein the first part, the second part, and the third part are disposed closer to the first gate line with reference to the second gate line.

6. The liquid crystal display device of claim 5, wherein the spacer light shield further includes fourth to sixth parts disposed closer to the third gate line with reference to the second gate line,
the fourth part is formed integrally with the second main light shield and the sub light shield between the first main light shield and the second main light shield,
the fifth part is formed integrally with the second main light shield, the third main light shield, and the sub light shield between the second main light shield and the third main light shield,
the sixth part is formed integrally with the third main light shield and the sub light shield between the third main light shield and the fourth main light shield,
the fourth part is distant from the first main light shield, and the sixth part is distant from the fourth main light shield, and
a greatest width of the fifth part along the second direction is greater than a greatest width of the fourth part along the second direction and a greatest width of the sixth part along the second direction.

7. The liquid crystal display device of claim 1, wherein the spacer light shield further includes a fourth part formed integrally with the second main light shield, the third main light shield, and the sub light shield between the second main light shield and the third main light shield,
the second part is disposed closer to the first gate line with reference to the second gate line, and
the fourth part is disposed closer to the third gate line with reference to the second gate line.

* * * * *